United States Patent
Lipka et al.

(10) Patent No.: US 11,948,058 B2
(45) Date of Patent: Apr. 2, 2024

(54) UTILIZING RECURRENT NEURAL NETWORKS TO RECOGNIZE AND EXTRACT OPEN INTENT FROM TEXT INPUTS

(71) Applicant: Adobe Inc., San Jose, CA (US)

(72) Inventors: Nedim Lipka, Santa Clara, CA (US); Nikhita Vedula, Columbus, OH (US)

(73) Assignee: Adobe Inc., San Jose, CA (US)

( * ) Notice: Subject to any disclaimer, the term of this patent is extended or adjusted under 35 U.S.C. 154(b) by 1086 days.

(21) Appl. No.: 16/216,296

(22) Filed: Dec. 11, 2018

(65) Prior Publication Data

US 2020/0184307 A1    Jun. 11, 2020

(51) Int. Cl.
  *G06N 3/02*       (2006.01)
  *G06F 16/9032*   (2019.01)
  *G06F 40/30*      (2020.01)
  *G06N 20/00*      (2019.01)

(52) U.S. Cl.
  CPC ........... *G06N 3/02* (2013.01); *G06F 16/9032* (2019.01); *G06F 40/30* (2020.01); *G06N 20/00* (2019.01)

(58) Field of Classification Search
  CPC ...... G06N 3/02; G06N 20/00; G06F 16/9032; G06F 40/30
  See application file for complete search history.

(56) References Cited

U.S. PATENT DOCUMENTS

| | | | |
|---|---|---|---|
| 2015/0261743 A1* | 9/2015 | Sengupta | G06F 40/232 704/9 |
| 2019/0035387 A1* | 1/2019 | Zitouni | G10L 15/1815 |
| 2020/0142959 A1* | 5/2020 | Mallinar | G06N 20/20 |
| 2020/0184959 A1* | 6/2020 | Yasa | G06F 40/30 |
| 2020/0251091 A1* | 8/2020 | Zhao | G06N 5/022 |
| 2020/0410987 A1* | 12/2020 | Tsunoo | G10L 15/22 |

OTHER PUBLICATIONS

Xia, Congying, et al. "Zero-shot user intent detection via capsule neural networks." arXiv preprint arXiv:1809.00385 (2018). (Year: 2018).*

Ravuri, Suman, and Andreas Stoicke. "A comparative study of neural network models for lexical intent classification." 2015 IEEE Workshop on Automatic Speech Recognition and Understanding (ASRU). IEEE, 2015. (Year: 2015).*

(Continued)

*Primary Examiner* — Michael J Huntley
*Assistant Examiner* — Sehwan Kim
(74) *Attorney, Agent, or Firm* — Keller Preece PLLC

(57) ABSTRACT

The present disclosure relates to systems, non-transitory computer-readable media, and methods that utilize recurrent neural networks to determine the existence of one or more open intents in a text input, and then extract the one or more open intents from the text input. In particular, in one or more embodiments, the disclosed systems utilize a trained intent existence neural network to determine the existence of an actionable intent within a text input. In response to verifying the existence of an actionable intent, the disclosed systems can apply a trained intent extraction neural network to extract the actionable intent from the text input. Furthermore, in one or more embodiments, the disclosed systems can generate a digital response based on the intent identified from the text input.

20 Claims, 12 Drawing Sheets

(56) References Cited

OTHER PUBLICATIONS

Ding, Xiao, et al. "Mining user consumption intention from social media using domain adaptive convolutional neural network." Proceedings of the AAAI Conference on Artificial Intelligence. vol. 29. No. 1. 2015. (Year: 2015).*
Nguyen, Dat Quoc, Mark Dras, and Mark Johnson. "A novel neural network model for joint POS tagging and graph-based dependency parsing." arXiv preprint arXiv:1705.05952 (2017). (Year: 2017).*
Coucke, Alice, et al. "Snips voice platform: an embedded spoken language understanding system for private-by-design voice interfaces." arXiv preprint arXiv:1805.10190 (2018). (Year: 2018).*
Ding, Zixiang, et al. "Densely connected bidirectional lstm with applications to sentence classification." CCF International Conference on Natural Language Processing and Chinese Computing. Springer, Cham, 2018. (Year: 2018).*
Shu, Bo, Fuji Ren, and Yanwei Bao. "Investigating lstm with k-max pooling for text classification." 2018 11th International Conference on Intelligent Computation Technology and Automation (ICICTA). IEEE, 2018. (Year: 2018).*
Ma, Xuezhe, and Eduard Hovy. "End-to-end sequence labeling via bi-directional lstm-cnns-crf." arXiv preprint arXiv:1603.01354 (2016). (Year: 2016).*
Manning, Christopher D., et al. "The Stanford CoreNLP natural language processing toolkit." Proceedings of 52nd annual meeting of the association for computational linguistics: system demonstrations. 2014. (Year: 2014).*
Abdel-Hamid, Ossama, Li Deng, and Dong Yu. "Exploring convolutional neural network structures and optimization techniques for speech recognition." Interspeech. vol. 11. 2013. (Year: 2013).*
Straka, Milan, Jan Hajic, and Jana Straková. "UDPipe: trainable pipeline for processing CoNLL-U files performing tokenization, morphological analysis, pos tagging and parsing." Proceedings of the Tenth International Conference on Language Resources and Evaluation (LREC'16). 2016. (Year: 2016).*
Kim, Joo-Kyung, et al. "Intent detection using semantically enriched word embeddings." 2016 IEEE Spoken Language Technology Workshop (SLT). IEEE, 2016. (Year: 2016).*
Liu, Chaoyuan, et al. "Using artificial intelligence (Watson for Oncology) for treatment recommendations amongst Chinese patients with lung cancer: feasibility study." Journal of medical Internet research 20.9 (2018): e11087. (Year: 2018).*
Ramnani, Roshni R., Shubhashis Sengupta, and Poulami Debnath. "Intelligent Travel Advisor: A Goal Oriented Virtual agent with Task Modeling, Planning and User Personalization." Proceedings of the 18th International Conference on Intelligent Virtual Agents. 2018. (Year: 2018).*
Heck, Larry, and Dilek Hakkani-Tür. "Exploiting the semantic web for unsupervised spoken language understanding." 2012 IEEE Spoken Language Technology Workshop (SLT). IEEE, 2012. (Year: 2012).*
Xu, P., & Sarikaya, R. (Dec. 2013). Convolutional neural network based triangular crf for joint intent detection and slot filling. In Automatic Speech Recognition and Understanding (ASRU), 2013 IEEE Workshop on (pp. 78-83). IEEE.
Guo, D., Tur, G., Yih, W. T., & Zweig, G. (Dec. 2014). Joint semantic utterance classification and slot filling with recursive neural networks. In Spoken Language Technology Workshop (SLT), 2014 IEEE (pp. 554-559). IEEE.
Yao, K., Peng, B., Zhang, Y., Yu, D., Zweig, G., & Shi, Y. (Dec. 2014). Spoken language understanding using long short-term memory neural networks. In Spoken Language Technology Workshop (SLT), 2014 IEEE (pp. 189-194). IEEE.
Mesnil, G., Dauphin, Y., Yao, K., Bengio, Y., Deng, L., Hakkani-Tur, D., . . . & Zweig, G. (2015). Using recurrent neural networks for slot filling in spoken language understanding. IEEE/ACM Transactions on Audio, Speech, and Language Processing, 23(3), 530-539.
Liu, B., & Lane, I. (2016). Attention-based recurrent neural network models for joint intent detection and slot filling. arXiv preprint arXiv:1609.01454.
Manning, C., Surdeanu, M., Bauer, J., Finkel, J., Bethard, S., & McClosky, D. (2014). The Stanford CoreNLP natural language processing toolkit. In Proceedings of 52nd annual meeting of the association for computational linguistics: system demonstrations (pp. 55-60).
Kingma, D. P., & Ba, J. (2014). Adam: A method for stochastic optimization. arXiv preprint arXiv:1412.6980.
Pennington, J., Socher, R., & Manning, C. (2014). Glove: Global vectors for word representation. In Proceedings of the 2014 conference on empirical methods in natural language processing (EMNLP) (pp. 1532-1543).

* cited by examiner

UTILIZING RECURRENT NEURAL NETWORKS TO RECOGNIZE AND EXTRACT OPEN INTENT FROM TEXT INPUTS

BACKGROUND

Recent years have seen significant improvement in hardware and software platforms for natural language understanding of text inputs. Indeed, conventional systems can now classify intent data from text inputs to determine an actionable intent category corresponding to the text inputs. For example, conventional systems can identify a single intent from a digital text input by utilizing a computer model trained to classify an intent that falls within predefined categories.

Although conventional systems can classify a single intent from a text input, this categorical approach gives rise to a number of technological problems in accuracy, flexibility, and efficiency. For example, conventional systems often receive text inputs that do not align to predefined categories. In such circumstances, conventional systems cannot accurately identify the intent corresponding to the text input, inasmuch as any predefined category fails to accurately capture the intent. Additionally, text input from various digital sources often does not include any actionable intent. Nonetheless, in such circumstances, conventional systems often analyze and inaccurately identify an intent where none exists.

Moreover, conventional systems are rigid and inflexible. Indeed, as just mentioned, conventional systems are rigidly tied to predefined intent categories. Accordingly, conventional systems fail to flexibly extract intents that do not conform with preexisting classifications. Additionally, conventional systems are rigidly limited to extracting only one intent from a text input. This rigidity leads to additional inaccuracy, in that conventional systems only identify a single intent from digital text input, even when additional intents may exist. Furthermore, conventional systems are also rigidly tied to available training resources. Thus, if a text input falls outside of conversational domains utilized to train a computer model, conventional systems will often generate inaccurate intent classification predictions.

In addition to shortcomings with regard to accuracy and flexibility, conventional systems are also inefficient. As an initial matter, conventional systems expend significant resources in identifying labeled training data and then training pertinent computer models. Moreover, conventional systems often inefficiently utilize computing resources attempting to identify an intent in a text input that does include any intent. Furthermore, conventional systems that inaccurately classify intent from digital text inputs, further waste computational resources in performing additional additional language understanding tasks (e.g., generating inaccurate digital responses to digital text inputs) based on an incorrectly extracted intent.

Thus, there are several technical problems with regard to conventional digital text input identification systems.

SUMMARY

One or more embodiments provide benefits and/or solve one or more of the foregoing or other problems in the art with systems, methods, and non-transitory computer readable storage media that utilize recurrent neural networks to accurately determine the existence of one or more open intents in a text input, and then extract the one or more open intents from the text input. In particular, the open intent system can utilize multiple LSTM neural networks to automatically discover user intents in natural language without prior knowledge about any categories of intent (e.g., due to incomplete, inaccurate, or non-existing training data). For example, in one or more embodiments, the disclosed systems can train both an intent existence neural network and an intent extraction neural network with training data that is untethered from any intent categories. Specifically, in one or more embodiments, the disclosed systems train recurrent neural networks utilizing an unsupervised domain adaptation approach that allows the disclosed systems to flexibly transfer across adjacent conversational domains. Moreover, by applying the intent existence neural network to a text input, the disclosed systems can determine whether one or more intents exist in the text input. Based on this determination, the disclosed systems can apply the intent extraction neural network to the text input to extract the one or more intents from the text input. Thus, the disclosed systems can accurately, flexibly, and efficiently utilize computing resources to extract one (or a plurality of) actionable open intents, when intents exist in a text input.

Additional features and advantages of one or more embodiments of the present disclosure will be set forth in the description that follows, and in part will be obvious from the description, or may be learned by practice of such example embodiments.

BRIEF DESCRIPTION OF THE DRAWINGS

The detailed description is described with reference to the accompanying drawings in which.

DETAILED DESCRIPTION

Figure 1:
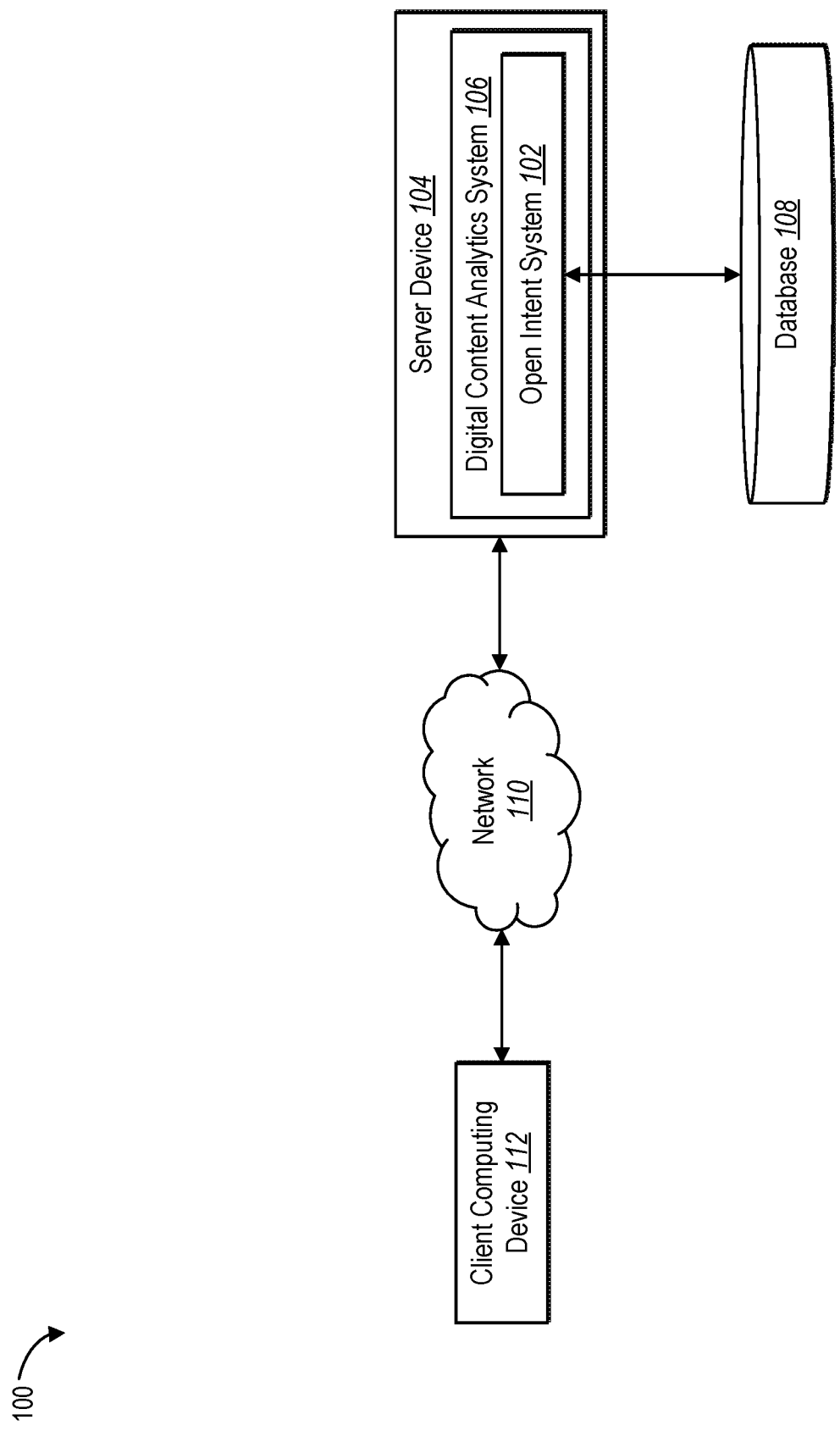
FIG. 1 illustrates an example environment in which an open intent system operates in accordance with one or more embodiments.

One or more embodiments of the present disclosure includes an open intent system that trains and utilizes recurrent neural networks to accurately determine the existence of one or more open intents in a text input and then efficiently and flexibly extract the one or more open intents from the text input. For example, the open intent system can train an intent existence neural network with unclassified training data to determine whether an open intent exists in text input. Similarly, the open intent system can train an intent extraction neural network with unclassified training data to extract an open intent from the text input. In training, the open intent system can utilize dependency parser training data generated via a dependency parsing model together with labeled intent data as part of an unsupervised domain adaptation strategy that allows for accurate transfer across conversational domains with less labeled training data. Upon training, based on a positive result from the intent existence neural network relative to a text input, the open intent system can apply the intent extraction neural network to the text input to extract any intent from the text input including open (or previously unseen) intents. Thus, the open intent system avoids pitfalls of conventional systems by accurately, flexibly, and efficiently determining whether any number of open intents exist in a text input and then, if at least one open intent exists, extracting the open intents from the text input.

To illustrate, in one or more embodiments the open intent system identifies a text input (e.g., audio-to-text transcription, or other user input of digital text). The open intent system can determine that an intent exists in the text input by applying an intent existence long short-term memory neural network to the text input. Specifically, the open intent system can apply an intent existence long short-term memory neural network (e.g., an "intent existence LSTM neural network") trained to determine existence of training intents (e.g., trained from intent existence training text and corresponding intent existence training markers). In response to determining that the intent exists in the text input, the open intent system can determine the intent by extracting an intent (e.g., a verb object pair) from the text input. Specifically, the open intent system can apply a trained intent extraction long short-term memory neural network (e.g., intent extraction LSTM neural network) to identify the pertinent verb object pair reflecting user intent.

As mentioned, the open intent system can determine the existence of (and extract) one or more open intents from text input by utilizing recurrent neural networks. In one or more embodiments, the open intent system trains an intent existence LSTM neural network to determine the existence of one or more intents in a text input. Specifically, the open intent system can train the intent existence LSTM neural network by applying the intent existence LSTM neural network to intent existence training data including intent existence training text and intent existence training markers. For example, in at least one embodiment, the intent existence training text includes positive text input including at least one intent, and negative text input including no intent. The intent existence training markers can include binary responses (e.g., "yes" or "no") indicating a ground truth as to whether at least one intent exists in the corresponding intent existence training text.

In one or more embodiments, the open intent system also trains an intent extraction LSTM neural network to extract one or more open intents from a text input. Specifically, the open intent system can train the intent extraction LSTM neural network by applying the intent extraction LSTM neural network to intent extraction training data including intent extraction training text and intent extraction training markers that correspond to the intent extraction training text. In one or more embodiments, the intent extraction LSTM neural network includes and utilizes a conditional random field (CRF) layer and may be referred to as an intent extraction LSTM-CRF neural network.

As mentioned above, in at least one embodiment, the open intent system utilizes an unsupervised domain adaptation approach. For example, the open intent system can train the intent extraction LSTM neural network utilizing intent extraction training text that includes training text inputs from across varied conversational domains. The intent extraction training markers can include verb object pairs found in each training text input. In at least one embodiment, the open intent system can further refine the training of the intent extraction LSTM neural network by applying the intent extraction LSTM neural network to user-labeled training data. In this manner, the open intent system can train an intent extraction LSTM neural network that is flexible and accurate across adjacent different conversational domains.

After training both the intent existence and intent extraction LSTM neural networks, the open intent system can apply the intent existence and intent extraction LSTM neural networks to text input in order to extract open intents from the text input. For example, in response to receiving a text input (e.g., a digital inquiry from a client device across a computer network), the open intent system can first apply the intent existence LSTM neural network to the received text input to determine whether an intent exists in the text input. As such, in at least one embodiment, the intent existence LSTM neural network outputs a response (e.g., "Yes" or "No") indicating either that the text input includes at least one intent, or that the text input includes no intent.

In response to a positive output from the intent existence LSTM neural network (e.g., indicating the text input includes one or more intents), the open intent system can then apply the intent extraction LSTM neural network to the text input. As mentioned above, the intent extraction LSTM neural network is trained to extract all of the one or more intents from the text input (e.g., with no regard to any predefined classifications or categories into which those intents may or may not fall). For example, the intent extraction LSTM neural network can extract all intents from the text input as verb object pairs. After extracting all of the intents from the text input as verb object pairs, the open intent system can generate or perform a variety of digital responses based on the extracted verb object pairs.

The open intent system provides many advantages and benefits over conventional systems and methods. For example, by determining whether an open intent exists in a text input and extracting the open intent from the text input, the open intent system improves accuracy relative to conventional systems. Specifically, the open intent system operates free from any predefined categories or classifications of intent. Thus, the open intent system can accurately extract intents from text input even when those intents are previously unknown to the open intent system. Additionally, the open intent system does not inaccurately generate intent classifications in circumstances where text input does not include any intent. Rather, the open intent system utilizes a trained intent existence LSTM neural network to determine whether an open intent exists in a text input.

Moreover, by utilizing an approach to intent existence determination and extraction that is independent of intent types or categories, the open intent system improves flexibility relative to conventional systems. For example, as just discussed, where conventional systems can only extract intents that fall within known categories of intents, the open intent system flexibly extracts any intent regardless of its potential categorization. For example, the open intent system can generate a report of any variety of intents (e.g., known, previously unknown, trending), regardless of classification. Additionally, where conventional systems rigidly identify only a single intent per text input, the open intent system can extract all intents that present in a text input (regardless of number). In addition, by utilizing an unsupervised domain adaptation strategy to training, the open intent system can flexibly train accurate LSTM neural networks for various domains. This also leads to increased efficiency and accuracy by significantly reducing labeled data utilized in training while allowing for accurate, flexible transfer across conversational domains.

Furthermore, by approaching every text input with no preconceived limits as to the number and categorization of intents in a text input, the open intent system improves efficiency relative to conventional systems. Specifically, the open intent system does not waste system resources in attempting to extract an intent from a text input that fails to include an intent. Additionally, the open intent system does not squander further computational resources in performing additional digital tasks (e.g., generating digital responses) based on inaccurately extracted intents.

As illustrated by the foregoing discussion, the present disclosure utilizes a variety of terms to describe features and advantages of the open intent system. Additional detail is now provided regarding the meaning of such terms. For example, as used herein, the term "text input" refers to text provided by a computing device and/or user. In some embodiments, a text input may also be referred to as an "utterance." In particular, text input can include written text (e.g., digital text typed and provided via a client device) or spoken text (e.g., digital text generated via a microphone of a client device). For example, text input can include a digital dialogue via text messaging, digital comments provided via a web page, text provided in a call, text from an email, text from a mobile application, or text from a social messaging post or electronic message.

In addition, as used herein the term "intent" refers to a purpose, action, request, or instruction associated with a text input. In particular, the term "intent" can include a verb object pair extracted from a text input that indicates requested (or desired) action or conduct. For instance, in the text input, "How do I save my text file," an intent can include the verb object pair, "save file." In one or more embodiments, a verb object pair is not limited to a single verb and a single object. For example, a verb object pair can include one or more verbs, one or more objects, and/or one or more modifiers (e.g., adjectives or adverbs) (e.g., in photo editing, a verb object pair reflecting an intent can include "brighten blue jacket" which comprises a verb, adjective, and noun).

Additionally, as used herein, the term "open intent" refers to an intent identified without reference to a predefined category or classification of intents. In particular, an open intent includes a verb object pair extracted from a text input without classifying the verb object pair to a specific category. For example, as discussed above, a conventional system may utilize a model trained to extract intents from text input by classifying intent relative to predetermined classes. Such an intent would not fall within the term "open intent."

As mentioned, the open intent system can utilize different neural networks to determine intent existence and perform intent extraction. As used herein, the term "neural network" refers to a machine learning model that can be tuned (e.g., trained) based on inputs to approximate unknown functions. In particular, the term neural network can include a model of interconnected artificial neurons (or layers) that communicate and learn to approximate complex functions and generate outputs based on a plurality of inputs provided to the model. In particular, a neural network includes a computer-implemented algorithm that implements deep learning techniques to analyzes input (e.g., training input encoded as a neural network input vector) to make predictions and that improves in accuracy by comparing generated predictions against ground truth data and modifying internal parameters for subsequent predictions. In some embodiments, a neural network can employ supervised learning, while in other embodiments a neural network can employ unsupervised learning or reinforced learning. Examples of neural networks include deep convolutional neural networks, generative adversarial neural networks, and recurrent neural networks.

As used herein, the term "recurrent neural network" refers to a type of neural network that performs analytical tasks on sequential elements and analyzes individual elements based on computations (e.g., latent feature vectors) from other elements. In particular, a recurrent neural network includes an artificial neural network that uses sequential information associated with words in a text input (e.g., a sentence), and in which an output of a current word is dependent on computations (e.g., latent feature vectors) for previous words.

Furthermore, as used herein, the terms "long short-term memory neural network" and "LSTM neural network" refer to a type of recurrent neural network capable of learning long-term dependencies in sequential information. Specifically, an LSTM neural network can include a plurality of layers that interact with each other to retain additional information between LSTM units (e.g., "long short-term memory units" that are layers of the neural network for analyzing each sequential input, such as each word) of the network in connection with a state for each LSTM unit. As used herein, the term "state" refers to a component of each LSTM unit that includes long-term information from previous LSTM units of the LSTM neural network. The LSTM neural network can update the state for each LSTM unit (e.g., during an "update stage") by using the plurality of layers to determine which information to retain and which information to forget from previous LSTM units. The state of each LSTM unit thus influences the information that is retained from one LSTM unit to the next to form long-term dependencies across a plurality of LSTM units. Furthermore, as will be described in greater detail below, the open intent system can perform one or more "training stages" during which the open intent system updates parameters of the LSTM neural network (e.g., the intent existence LSTM neural network and/or the intent extraction LSTM neural network) based on training data.

Relatedly, the term "train" refers to utilizing information to tune or teach a neural network. The term "training" (used as an adjective or descriptor, such as "training data") refers to information or data utilized to tune or teach the neural network. In some embodiments, the open intent system trains one or more of the above-described neural networks to generate accurate predictions based on respective training data.

For example, as used herein, training data can include training inputs and corresponding training markers. In at least one embodiment, a training marker includes a ground truth associated with a corresponding training input. To illustrate, the open intent system can train an intent existence LSTM neural network with intent existence training data including intent existence training text and corresponding intent existence training markers (e.g., markers indicating the presence of intent within the training text). For instance, intent existence training text can include positive text inputs and negative text inputs. As used herein, a "positive text input" refers to a text input that includes at least one intent, while a "negative text input" refers to a text input with no intent.

Similarly, the open intent system can train an intent extraction LSTM neural network with intent extraction training data including intent extraction training text and corresponding intent extraction training markers. In one or more embodiments, the open intent system utilizes intent extraction training data that includes dependency parser training data and user-labeled training data. As used herein, dependency parser training data refers to model-generated training inputs and corresponding training markers. In particular, each training marker can indicate a ground truth of verb and object tags included in the corresponding training input. For example, dependency parser training data (sometimes referred to as part of speech training data, unsupervised part of speech training data, or unsupervised POS training data) may be generated utilizing an unsupervised approach by applying a dependency parsing model to unlabeled or unmarked inputs (e.g., unlabeled sentences). For example, the open intent system may leverage unlabeled data by using a dependency parsing model such as the Stanford Dependency Parser from the Standford CoreNLP that generates grammatical parsing tags or labels of "verb" or object" for each word in an unlabeled text input. As used herein, user-labeled training data refers to training inputs and corresponding training markers, where each training marker indicates a user-generated ground truth of one or more intents included in the corresponding training input. For example, such user-labeled training data may be generated via a crowd source application such as AMAZON MECHANICAL TURK.

Additional detail regarding the open intent system will now be provided with reference to the figures. For example, FIG. 1 illustrates a schematic diagram of an example environment 100 for implementing the open intent system 102 in accordance with one or more embodiments. Thereafter, a more detailed description of the components and processes of the open intent system 102 is provided in relation to the subsequent figures.

As shown in FIG. 1, the environment 100 includes a server device 104, a client computing device 112, and a network 110. Each of the components of the environment 100 can communicate via the network 110, and the network 110 may be any suitable network over which computing devices can communicate. Example networks are discussed in more detail below in relation to FIG. 12.

As mentioned, the environment 100 includes the client computing device 112. The client computing device 112 can be one of a variety of computing devices, including a smartphone, tablet, smart television, desktop computer, laptop computer, virtual reality device, augmented reality device, or other computing device as described in relation to FIG. 12. Although FIG. 1 illustrates a single client computing device 112, in some embodiments the environment can include multiple different client computing devices, each associated with a different user. The client computing device 112 can further communicate with the server device 104 via the network 110. For example, the client computing device 112 can receive user input (e.g., a text input) and provide the information pertaining to user input to the server device 104. Thus, the open intent system 102 on the server device 104 can receive the user input to use in identifying and extracting one or more intents.

In one or more embodiments, the client computing device 112 includes a client application for providing user input to the open intent system 102. In particular, the client application may be a web application, a native application installed on the client computing device 112 (e.g., a mobile application, a desktop application, etc.), or a cloud-based application where part of the functionality is performed by the server device 104. The client application can present or display information to a user, including the results of a digital response generated by the open intent system 102, or another system functioning in tandem with the open intent system 102.

As illustrated in FIG. 1, the environment 100 includes the server device 104. The server device 104 may include one or more individual servers that may generate, store, receive, and transmit electronic data, such as parameters utilized for extracting intents (e.g., parameters associated with one or more neural networks). For example, the server device 104 may receive data from the client computing device 112 in the form of a text input. In addition, the server device 104 can transmit data to the client computing device 112 to provide results of a digital response based on an extracted intent. Furthermore, the server device 104 can include one or more neural networks such as an intent existence LSTM neural network and an intent extraction LSTM neural network. For example, the server device 104 can communicate with the client computing device 112 to transmit and/or receive data via the network 110. In some embodiments, the server device 104 comprises a content server. The server device 104 can also comprise an application server, a communication server, a web-hosting server, a social networking server, or a digital content analytics server.

As shown in FIG. 1, the server device 104 can also include the open intent system 102 as part of a digital content analytics system 106. The digital content analytics system 106 can communicate with the client computing device 112 to generate, modify, and transmit digital content. For example, the digital content analytics system 106 can capture, manage, and edit digital images (and receive text inputs comprising an intent to modify the digital images). Similarly, the digital content analytics system 106 can gather, manage, and analyze digital data collected from a variety of client devices (and receive text inputs comprising an intent to generate user interfaces for client devices to efficiently and accurately interpret, analyze, and utilize the digital data). Additionally, in one or more embodiments, the open intent system 102 and/or the digital content analytics system 106 can access the database 108. For example, in response to extracting an intent from a text input, the open intent system 102 can determine a digital response that involves querying the database 108.

Although FIG. 1 depicts the open intent system 102 located on the server device 104, in some embodiments, the open intent system 102 may be implemented by (e.g., located entirely or in part) on one or more other components of the environment 100. For example, the open intent system 102 may be implemented by the client computing device 112 and/or a third-party device.

In some embodiments, though not illustrated in FIG. 1, the environment 100 may have a different arrangement of components and/or may have a different number or set of components altogether. For example, the client computing device 112 may include one or more neural networks such as an intent existence LSTM neural network and an intent extraction LSTM neural network. As another example, the client computing device 112 may communicate directly with the open intent system 102, bypassing the network 110. The open intent system 102 can be implemented in a variety of different ways across the server device 104, the network 110, and the client computing device 112. Additional detail regarding implementing different components of the open intent system 102 across devices is provided below.

Figure 2:
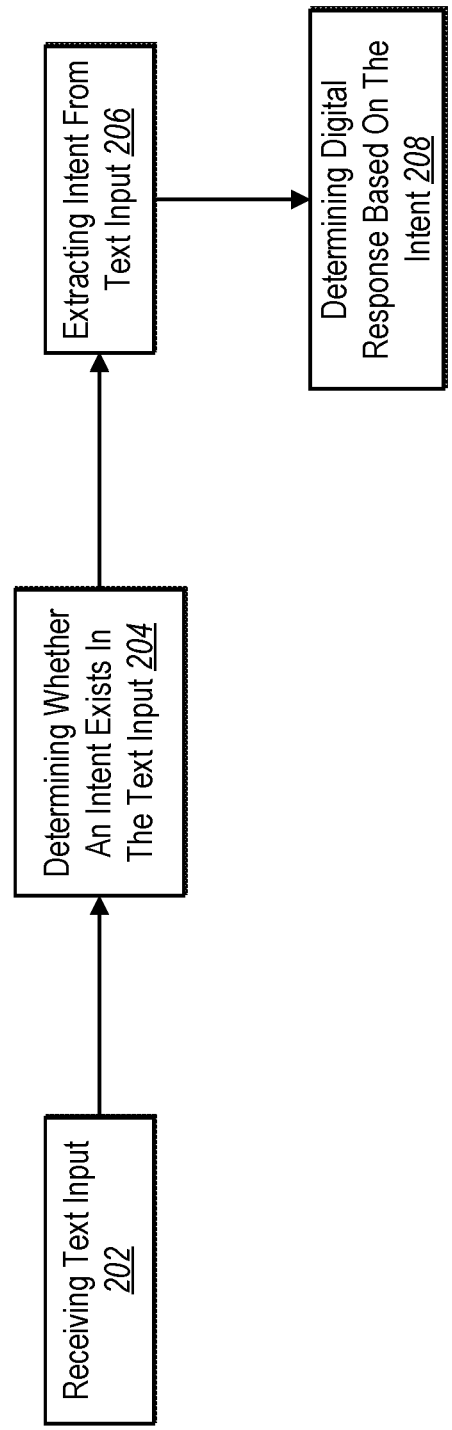
FIG. 2 illustrates a flowchart of determining the existence of and extracting one or more open intents in accordance with one or more embodiments.

As discussed above, the open intent system 102 can determine the existence of one or more open intents in a text input, and then extract the one or more open intents based on the determination. For instance, FIG. 2 illustrates an overview of the process by which the open intent system 102 recognizes and extracts open intents from a text input. Specifically, FIG. 2 illustrates the open intent system 102 performing a step 202 of receiving a text input. For example, in one or more embodiments, the open intent system 102 can receive a text input directly from the client computing device 112 (e.g., via a web form, a native application, a social media communication thread). Additionally or alternatively, the open intent system 102 can receive user input (e.g., an audio or voice input or gesture input) from the client computing device 112. In that embodiment, the open intent system 102 can extrapolate a text input from the received user input by utilizing natural language processing, machine learning, database lookups, etc.

As shown in FIG. 2, after receiving the text input, the open intent system 102 performs a step 204 of determining whether at least one open intent exists in the text input. For example, as mentioned above, the open intent system 102 determines whether at least one open intent exists in the text input by applying a trained intent existence LSTM neural network to the text input. In at least one embodiment, the intent existence LSTM neural network outputs a binary prediction (e.g., "yes" or "no") of whether at least one intent exists within the text input.

Based on a positive prediction from the intent existence LSTM neural network, the open intent system 102 performs a step 206 of extracting the one or more open intents from the text input. For example, as mentioned above, the open intent system 102 extracts open intents from the text input by applying a trained intent extraction LSTM neural network to the text input. In at least one embodiment, the intent extraction LSTM neural network outputs one or more open intents from the text input as verb object pairs.

As shown in FIG. 2, after extracting the one or more open intents from the text input, the open intent system performs a step 208 of determining a digital response based on the one or more open intents. For example, the open intent system 102 can perform a variety of actions in response to extracting one or more open intents from a text input. For example, the open intent system 102 can: generate a digital text response (e.g., in a text chat), perform a requested function (e.g., perform a requested edit of a digital, generate a requested report or digital visualization), identify and report common issues reported to customer support or public forms; recognize and report missing functionality in applications with conversational or natural language interfaces; highlight calls to action in emails, documents, or recorded meetings and conversations; generate a digital summary; route inquiries to specialized services; assign customer support requests to experts; and/or recommend content to the user of the client computing device 112.

In one or more embodiments, the step 208 of determining a digital response can also include creating a report of intents. For example, after analyzing multiple text inputs, the open intent system 102 can generate a report of known, unknown, and/or trending intents extracted from the analyzed text inputs. This can assist a user or system in generating targeted deliverables such as advertisement campaigns, FAQs, email distributions, and/or other text-based products and services.

Figure 3:
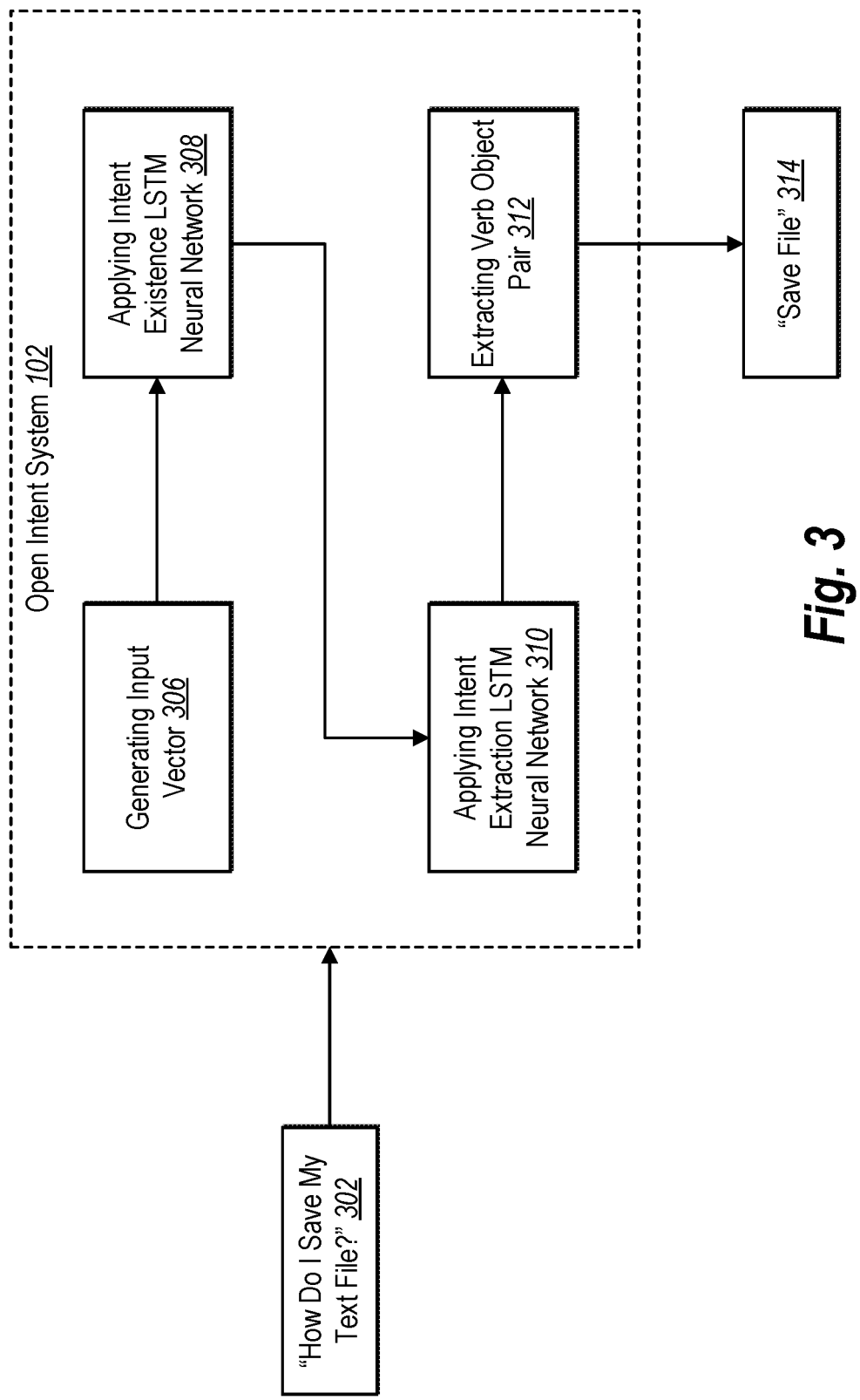
FIG. 3 illustrates a diagram of determining the existence of and extracting one or more open intents in accordance with one or more embodiments.

As mentioned above, the open intent system 102 can determine the existence of and extract one or more open intents from a text input. For instance, FIG. 3 illustrates additional detail with regard to identifying and extracting open intents in accordance with one or more embodiments. Specifically, FIG. 3 shows the open intent system 102 receiving the text input 302 "How do I save my text file?". In one or more embodiments, the open intent system 102 receives the text input 302 from the client computing device 112 (e.g., as shown in FIG. 1) as an electronic communication via a communication application (e.g., a social media communication application). Thus, the open intent system 102 can receive the text input 302 as part of a communication thread, an email, an SMS text message, or other similar electronic communication. Alternatively or additionally, the open intent system 102 can receive another type of user input (e.g., a voice input, a gesture input) from the client computing device 112. In that embodiment, the open intent system 102 can generate the text input 302 based on an analysis of the user input.

In response to receiving the text input 302, the open intent system 102 performs the step 306 of generating one or more input vectors based on the text input 302. For example, in one or more embodiments, the open intent system 102 generates an input vector by encoding information from the text input 302 into a fixed-length vector representation. In at least one embodiment, the open intent system 102 generates the input vector by parsing the text input 302 into separate words and embedding the words into the fixed-length input vector. Alternatively, the open intent system 102 can parse the text input 302 into separate words and then generate an input vector for each word.

Next, the open intent system 102 performs the step 308 of applying the intent existence LSTM neural network to the text input 302. For example, the open intent system 102 can apply the intent existence LSTM neural network to the text input 302 by feeding the one or more generated input vectors into the intent existence LSTM neural network. As mentioned above, once trained, the intent existence LSTM neural network outputs a binary prediction as to whether a text input includes at least one open intent. As such, the result of the step 308 is a prediction (e.g., either "yes" or "no") as to whether the text input 302 embedded into the one or more input vectors includes at least one open intent.

In response to a positive prediction from the intent existence LSTM neural network in the step 308, the open intent system 102 performs the step 310 of applying the intent extraction LSTM neural network to the text input 302. For example, the open intent system 102 can apply the intent extraction LSTM neural network to the text input 302 by feeding the one or more input vectors generated in the step 306 into the intent extraction LSTM neural network. As mentioned above, once trained, the intent extraction LSTM neural network (utilizing a CRF layer) predicts a tag (e.g., "verb," "object," or "none") for each word in the text input 302.

With the predicted tags for each word in the text input 302, the open intent system 102 can perform the step 312 of extracting at least one verb object pair from the text input 302. For example, the open intent system 102 can analyze physical closeness and/or semantic closeness of verbs and objects tagged within the text input 302 to extract verb object pairs. In one or more embodiments, the open intent system 102 may utilize a word embedding procedure such as word2vec in order to determine verb object pairs within the text input 302.

As further illustrated in FIG. 3, in response to extracting the at least one verb object pair from the text input 302, the open intent system 102 outputs the extracted verb object pair 314 (e.g., "save file"). In one or more embodiments, the open intent system 102 can utilize the extracted verb object pair 314 to determine a further digital response. For example, as discussed above, the open intent system 102 can generate a database query (e.g., search for instructions for saving a file) respond to an electronic communication (e.g., generate an electronic communication with instructions for saving a file), and so forth.

Figure 4:
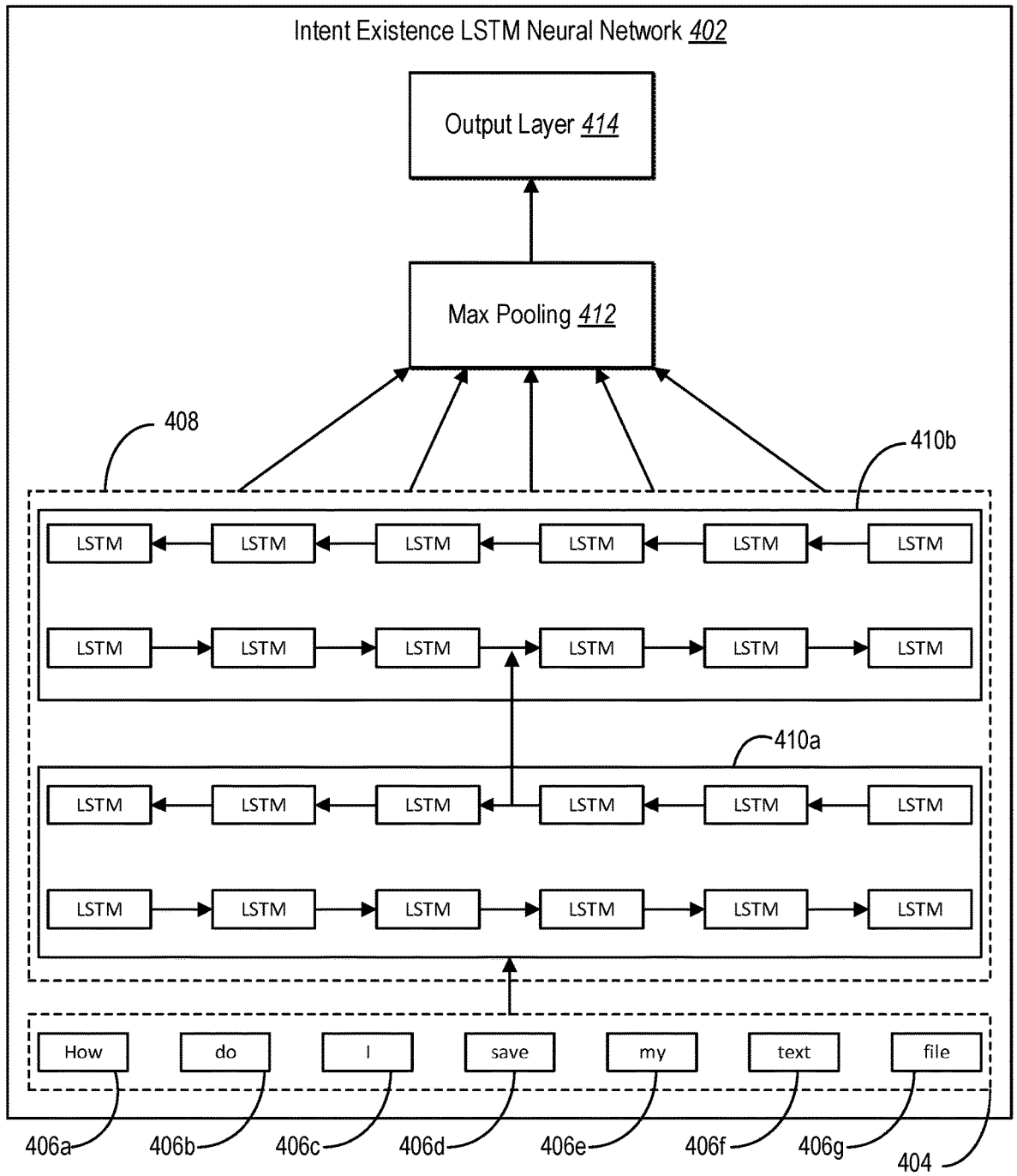
FIG. 4 illustrates a schematic diagram of an intent existence LSTM neural network in accordance with one or more embodiments.

As discussed above, the open intent system 102 utilizes an intent existence LSTM neural network to determine whether at least one open intent exists in a text input. For instance, FIG. 4 illustrates an example architecture of an intent existence LSTM neural network 402 in accordance with one or more embodiments. Specifically, FIG. 4 shows multiple layers that make up the intent existence LSTM neural network 402. For example, the first layer shown in the intent existence LSTM neural network 402 is the input layer 404.

As mentioned above, the input layer 404 of the intent existence LSTM neural network 402 receives a text input (e.g., the text input 302 shown in FIG. 3) and parses the text input into words 406a-406g. In one or more embodiments, the input layer 404 then embeds the words 406a-406g into one or more input vectors of fixed length. For example, the input layer 404 can encode the words 406a-406g utilizing one-hot encoding, or a neural embedding based on word semantics. The input layer 404 can then feed the one or more generated input vectors to one or more additional layers of the intent existence LSTM neural network 402.

For example, in one or more embodiments, the input layer 404 feeds the generated input vector for each word in the text input to the two-layered bi-directional LSTM layer 408 of the intent existence LSTM neural network 402. As shown in FIG. 4, the two-layered bi-directional LSTM layer 408 can include a first layer 410a and a second layer 410b. In at least one embodiment, both of the first layer 410a and the second layer 410b includes a series of LSTM units that are organized bi-directionally. In one or more embodiments, the bi-directional organization divides the LSTM units into two directions. For example, half of the LSTM units are organized 'forward,' or in a sequence over increasing sequence instances, while the other half of the LSTM units are organized 'backward,' or in a sequence over decreasing sequence instances. By organizing the LSTM units in opposite directions, the two-layered bi-directional LSTM layer 408 can simultaneously utilize content information from the past and future of the current sequence instance to inform the output layer 414.

Generally, each LSTM unit includes a cell, an input gate, an output gate, and a forget gate. As such, each LSTM unit can "remember" values over arbitrary time intervals while regulating the flow of information into and out of the unit.

Thus, for example, a first LSTM unit in the first layer 410a can analyze an input vector encoding the word 406a (e.g., "How"). A second LSTM unit in the first layer 410a can analyze an input vector encoding the word 406b (e.g., "do") as well as a feature vector from the first LSTM unit (e.g., a latent feature vector encoding significant features of the word "How" or other previous words in the sequence).

The organization illustrated in FIG. 4 enables the two-layered bi-directional LSTM layer 408 to sequentially model the text input, where latent feature vectors of previous layers (corresponding to previous text inputs and training text inputs) are passed to subsequent layers, and where hidden states of text inputs are obtained to generate vectors for each word 406a-406g embedded into the input vector. Each of the first layer 410a and the second layer 410b of the two-layered bi-directional LSTM layer 408 further determine relationships between words embedded into the input vector and other contextual information to generate output vectors.

As further illustrated in FIG. 4, the output vectors of the two-layered bi-directional LSTM layer 408 are collected in a max pooling layer 412. In one or more embodiments, the max pooling layer 412 utilizes a probability based soft-max algorithm to combine the output vectors of each layer of the two-layered bi-directional LSTM layer 408. For example, the max pooling layer 412 can utilize a probability based approach to identify words in the input text that have a high probability of being included in a verb object pair indicative of an intent.

In response to receiving the results of the max pooling layer 412, the output layer 414 generates a final prediction as to whether at least one intent exists in the text input. For example, the output layer 414 can generate a binary prediction that is either positive (e.g., "yes") or negative (e.g., "no") based on the results provided by the max pooling layer 412. Additional detail regarding the training of the intent existence LSTM neural network 402 is provided below with regard to FIG. 6.

Figure 5:
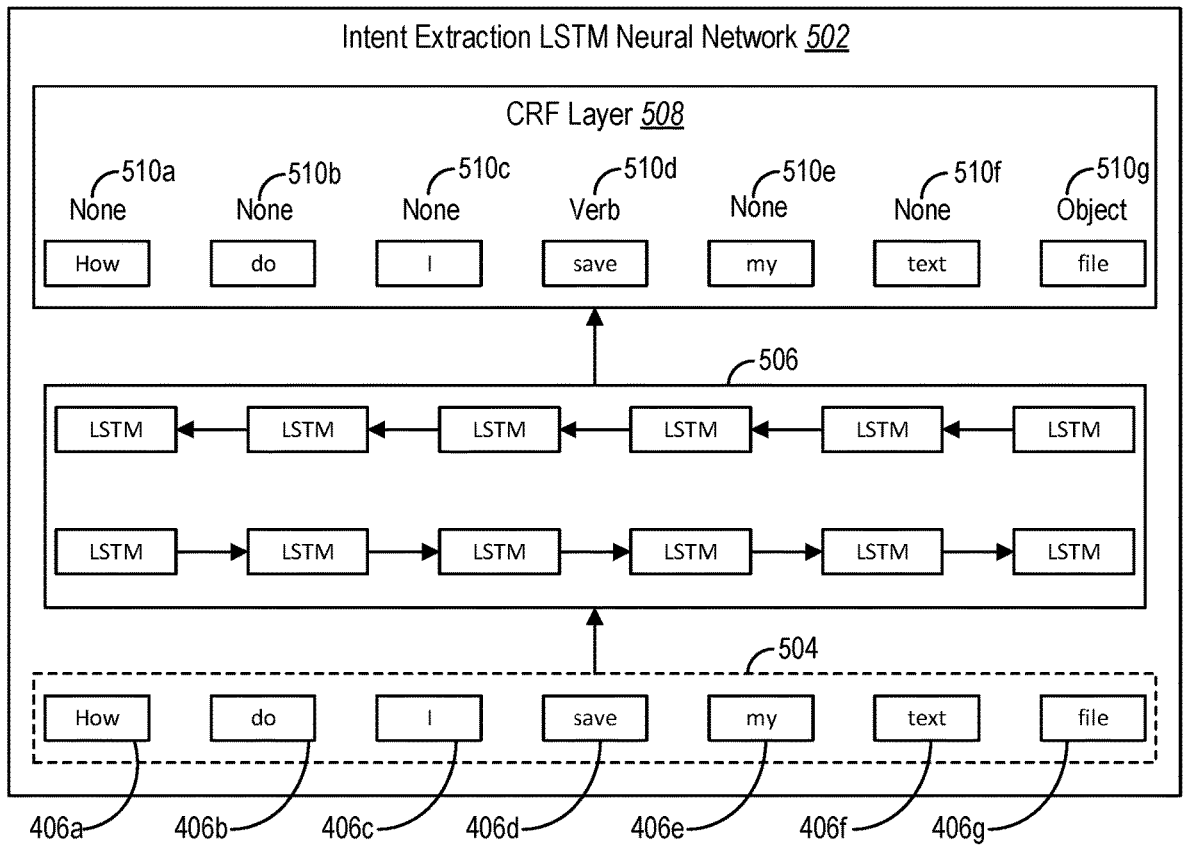
FIG. 5 illustrates a schematic diagram of an intent extraction LSTM neural network in accordance with one or more embodiments.

As discussed above, the open intent system 102 utilizes an intent extraction LSTM neural network to extract one or more open intents from a text input. For instance, FIG. 5 illustrates an example architecture of an intent extraction LSTM neural network 502 in accordance with one or more embodiments. Specifically, FIG. 5 shows the multiple layers that make up the intent extraction LSTM neural network 502. For example, the architecture of the intent extraction LSTM neural network 502 begins with the input layer 504. As discussed above with reference to the input layer 404 of the intent existence LSTM neural network 402, the input layer 504 of the intent extraction LSTM neural network 502 generates one or more fixed-length input vectors based on the text input. For instance, the input layer 504 can parse the text input into the words 406a-406g, and can then embed the words 406a-406g into fixed-length input vectors. For example, the input layer 404 can embed the words 406a-406g by encoding the words 406a-406g into an input vector utilizing one-hot encoding.

In one or more embodiments, the input layer 504 can provide the generated input vectors to the bi-directional LSTM layer 506. As shown in FIG. 5, the bi-directional LSTM layer 506 includes multiple LSTM units. As discussed above, each LSTM unit can include a cell, an input gate, an output gate, and a forget gate in order to "remember" values over arbitrary time intervals while regulating the flow of information into and out of the unit. The organization of the LSTM units allows the bi-directional LSTM layer 506 to generate a vector representation for each word in the text input based on past and future contexts.

Once the bi-directional LSTM layer 506 generates a vector representation for each word embedded into the input vector, the CRF (e.g., conditional random field) layer 508 can predict a tag with each word embedded in the input vector. For example, in at least one embodiment, the CRF layer 508 can assign one of three tags to each embedded word including one of "none," "verb," or "object." In other embodiments, the CRF layer 508 can assign any part of speech tag to an embedded word.

In one or more embodiments, the CRF layer 508 operates according to the following equation:

$$P(t_1, t_2, \ldots, t_n \mid x_1, x_2, \ldots, x_n; w) = \frac{\exp(w, \Phi(x, t))}{\sum_T \exp(w, \Phi(x, T))}$$

Where: $t_1, t_2, \ldots, t_n$ is a sequence of tags; $x_1, x_2, \ldots, x_n$ is a sequence of words from a text input, w is a weight matrix from the intent extraction LSTM neural network 502, and w, $\Phi(x, T) = \text{score}_{lstm\text{-}crf}(x, t)$ (e.g., representing how well the part of speech tag sequence fits the given sequence of words). In at least one embodiment, $\text{score}_{lstm\text{-}crf}(x, t)$ is calculated as: $\Sigma_{i=0}^n W_{t_{i-1}, t_i} * \text{LSTM}(x)_i + b_{t_{i-1}, t_i}$ where $W_{t_{i-1}, t_i}$ is a weight matrix (e.g., an outside knowledge matrix to better identify verb object pairs) and $b_{t_{i-1}, t_i}$ is bias. Additional detail regarding the training of the intent extraction LSTM neural network 502 is provided below with regard to FIG. 7.

As shown in FIG. 5, the output of the intent extraction LSTM neural network 502 is an intent tag for each word in the text input. For example, the intent extraction LSTM neural network 502 (with the CRF layer 508) tags each word as "verb," "object," or "none." After the intent extraction LSTM neural network 502 outputs these tags, the open intent system 102 can identify open intents as verb object pairs within the one or more input vectors based on the tags output by the intent extraction LSTM neural network 502. For example, in one or more embodiments, the open intent system 102 identifies a verb object pair based on the physical and/or semantic closeness of the component verb and object within the input vector. To illustrate, a verb and object may be physically close within an input vector if there are no or few words between the verb and object. A verb and object maybe semantically close within an input vector if the verb and object share a lexicological, syntactical, or etymological relationships within the input vector, even if the verb and object are not physically close within the input vector. In one or more embodiments, the open intent system 102 can identify a verb and object that are semantically close by applying a word2vec algorithm. For example, the open intent system 102 can utilize word2vec to transform each work into a semantic vector space and then identify within the semantic vector space words that are closest.

Although the example illustrated in FIG. 5 includes a single verb object pair (e.g., "save file"), the open intent system 102 identifies all verb object pairs within a text input regardless of their number. For example, the open intent system 102 can identify multiple verb object pairs within a text input. To illustrate, if the open intent system 102 identifies two verbs and two objects within a text input, the open intent system 102 can analyze the text input to determine the physical and/or semantic proximity of the identified verbs and objects. The open intent system 102 can utilize a scoring or other analytical approach to determine which verb and object is physically and/or semantically closest in order to identify the appropriate verb object pairs.

Thus, the open intent system 102 can output the extracted one or more intents (i.e., verb object pairs) from the text input.

In another illustrative example, given the text input "I work in a retail setting and am trying to create a fillable PDF for my team to use and need help!", the intent extraction LSTM neural network 502 will output a tag for each word in the text input. For example, the intent extraction LSTM neural network 502 will output "I<none> work<none> in<none> a<none> retail<none> setting<none> and<none> am<none> trying<none> to<none> create<verb> a 'fillable pdf'<object> for<none> my<none> team<none> to<none> use<none> and<none> need<none> help<object>!"

With this output from the intent extraction LSTM neural network 502, the open intent system 102 can identify verb-object pairs that are representative for the intent in the text input. For example, the open intent system 102 can utilize word2vec (or any other word embedding) to map the words in the text input to numerical vectors. From this, the open intent system 102 can determine the semantic distances between the verb object pairs "create fillable PDF," and "create help." Based on the vector distances between "create fillable PDF" being closer than the vector distances between "create help," the open intent system 102 can determine that "create fillable PDF" is the correct intent to extract from the text input. In other embodiments, the open intent system 102 can also utilize a language model that outputs probabilities for all verb object pairs extracted from the text input, and can then select the verb object pair with the highest probability.

Although the open intent system 102 is described throughout the illustrative figures as utilizing the intent existence LSTM neural network 402 and the intent extraction LSTM neural network 502 to identify and extract intents from text inputs, in additional embodiments, the open intent system 102 can utilize other types of neural networks for the same purpose. For example, in one embodiment, the open intent system 102 utilizes an encoder/decoder approach. To illustrate, the open intent system 102 can provide a text input to an encoder network that maps this raw input to a feature representation. The decoder network then utilizes this feature representation as input to generate a predictive output that identifies the an intent from within the text input. For instance, the encoder/decoder may extract an intent from the text input that includes one or more words that may not be part of the text input, but rather encapsulate the identified intent.

Figure 6:
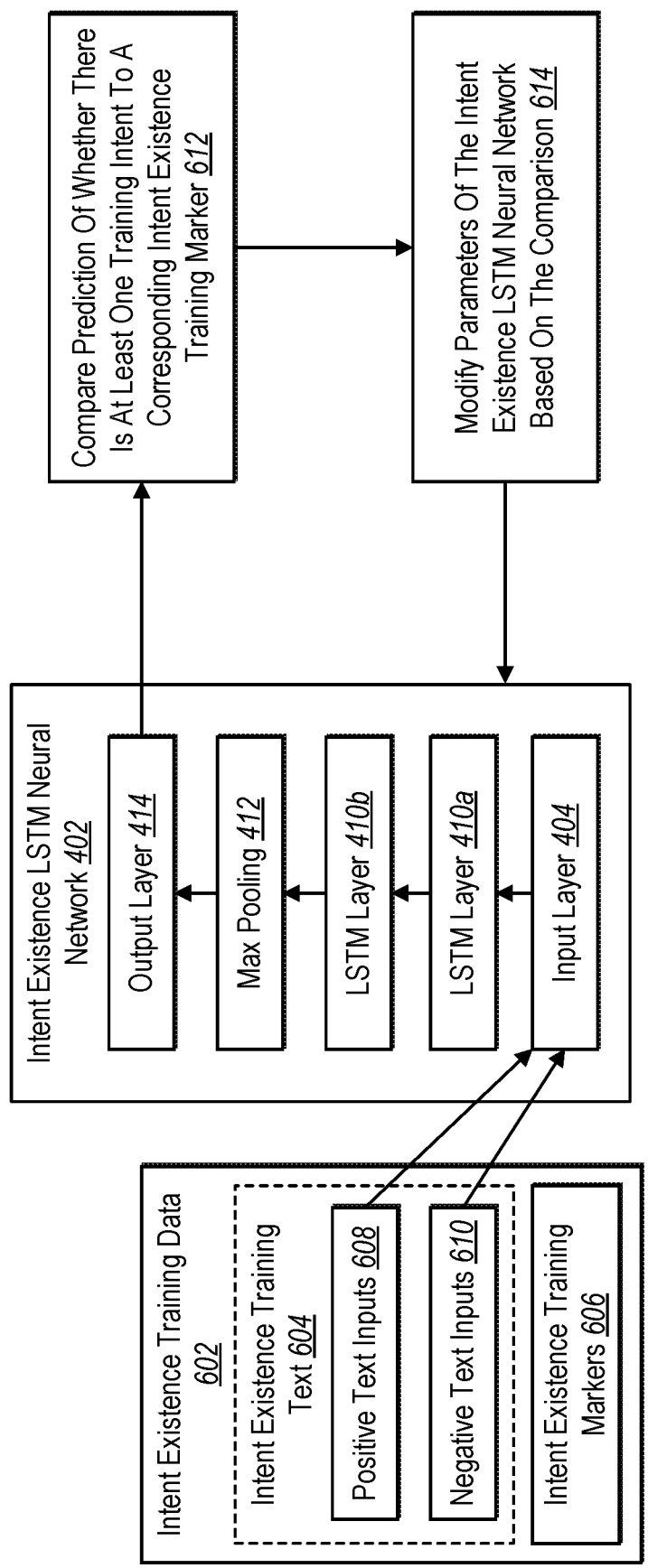
FIG. 6 illustrates a diagram of training an intent existence LSTM neural network in accordance with one or more embodiments.

As discussed above, the open intent system 102 can train an intent existence LSTM neural network to determine whether at least one open intent exists in a text input. For instance, FIG. 6 illustrates training an intent existence LSTM neural network in accordance with one or more embodiments. Specifically, as shown in FIG. 6, the open intent system 102 identifies the intent existence training data 602. For example, the open intent system 102 trains the intent existence LSTM neural network 402 based on intent existence training text 604 and intent existence training markers 606. In one or more embodiments, the open intent system 102 trains the intent existence LSTM neural network 402 by providing a text input from the intent existence training text 604 to the intent existence LSTM neural network 402 as an input vector, comparing the output of the intent existence LSTM neural network 402 to the intent existence training marker that corresponds to the text input, and then modifying the parameters of the intent existence LSTM neural network 402 based on the comparison. This process will now be described in greater detail.

As shown in FIG. 6, the intent existence training data 602 includes intent existence training text 604 and the intent existence training markers 606. In one or more embodiments, the intent existence training text 604 includes positive text inputs 608 and negative text inputs 610. For example, in at least one embodiment, the positive text inputs 608 includes text inputs that include at least one intent (e.g., at least one verb object pair indicating a desired action). Similarly, in at least one embodiment, the negative text inputs 610 include text input that include no intent (e.g., no actionable intent).

The positive text inputs 608 and the negative text inputs 610 can come from a wide range of general conversational domains. For example, in one embodiment, a positive text input may include a question with one or more actionable intents (e.g., "How do I save my text file?"). A negative text input may include an answer or explanation that includes verbs and objects, but not any actionable intent (e.g., "You can save by clicking the save button."). In at least one embodiment, part of the training cycle for the intent existence LSTM neural network 402 includes identifying question/answer pairs among the intent existence training text 604, where the open intent system 102 utilizes the identified question as a positive text input, and the identified answer as a negative text input. As such, the positive text inputs 608 and the negative text inputs 610 can be topically close even though only the positive text inputs 608 include an intent. Thus, utilizing the positive text inputs 608 and the negative text inputs 610 to train the intent existence LSTM neural network 402 leads to improvements in computational accuracy because the training teaches the intent existence LSTM neural network 402 to discriminate desired actions from explanations that do not include an actionable intent.

Each of the intent existence training markers 606 corresponds to one of the positive text inputs 608 or negative text inputs 610. For example, every positive text input corresponds to an intent existence training marker that includes a ground truth (e.g., "yes") associated with that positive text input indicating that the positive text input includes at least one intent. Similarly, every positive text input corresponds to an intent existence training marker that includes a ground truth (e.g., "no") associated with that negative text input indicating that the negative text input includes no intent.

To begin training the intent existence LSTM neural network 402, the open intent system 102 provides a text input from the intent existence training text 604 to the input layer 404. In one or more embodiments, the intent existence LSTM neural network 402 analyzes each word in the input text, passes latent feature vectors between each sequential layer in the intent existence LSTM neural network 402 (e.g., the first LSTM layer 410a and the second LSTM layer 410b) to retain and encode contextual meaning, pool prediction results (e.g., in the max pooling layer 412), and generate a prediction of whether the text input comprises at least one training intent. As mentioned above, in one or more embodiments, the generated prediction is binary (e.g., "yes" or "no").

After the intent existence LSTM neural network 402 generates the prediction, the open intent system 102 continues training the intent existence LSTM neural network 402 by performing the step 612 of comparing the generated prediction to a corresponding intent existence training marker. For example, as discussed above, for each intent existence training text 604, the intent existence training data 602 includes a corresponding intent existence training marker 606. Each intent existence training marker 606 includes a ground truth indicating whether the corresponding intent existence training text includes an intent. As such, the step 612 can involve the open intent system 102 determining whether the prediction generated by the intent existence LSTM neural network 402 matches the intent existence training marker that corresponds to the text input.

To continue training the intent existence LSTM neural network 402, the open intent system 102 performs the step 614 of modifying parameters of the intent existence LSTM neural network 402 based on the comparison performed in the step 612. For example, based on this comparison, the open intent system 102 can modify parameters of one or both of the first LSTM layer 410a and the second LSTM layer 410b to reduce the measure of loss. In one or more embodiments, the open intent system 102 continues training the intent existence LSTM neural network 402 until either the intent existence training text 604 is exhausted or the measure of loss is minimized and stable over a threshold number of training cycles. The open intent system 102 may periodically retrain the intent existence LSTM neural network 402 in the same manner illustrated in FIG. 6. Once training of the intent existence LSTM neural network 402 is complete, the open intent system 102 can apply the intent existence LSTM neural network 402 to unknown text inputs (e.g., text inputs with no corresponding training markers).

As discussed above, by utilizing the trained intent existence LSTM neural network 402, the open intent system 102 operates more efficiently and accurately. For example, when tested against an alternative approach for determining intent, the trained intent existence LSTM neural network 402 operated with more accuracy. The results of this testing are illustrated in Table 1 below:

TABLE 1

| Model | F1-Score |
|---|---|
| Random Forest + N-grams + POS tags + keywords | 0.61 |
| Trained Intent Existence LSTM Neural Network | 0.86 |

With regard to Table 1, Random Forest refers to a random forest classifier with feature inputs as a combination of word n-grams, part-of-speech stages, and specific keywords extracted from the text input.

Figure 7:
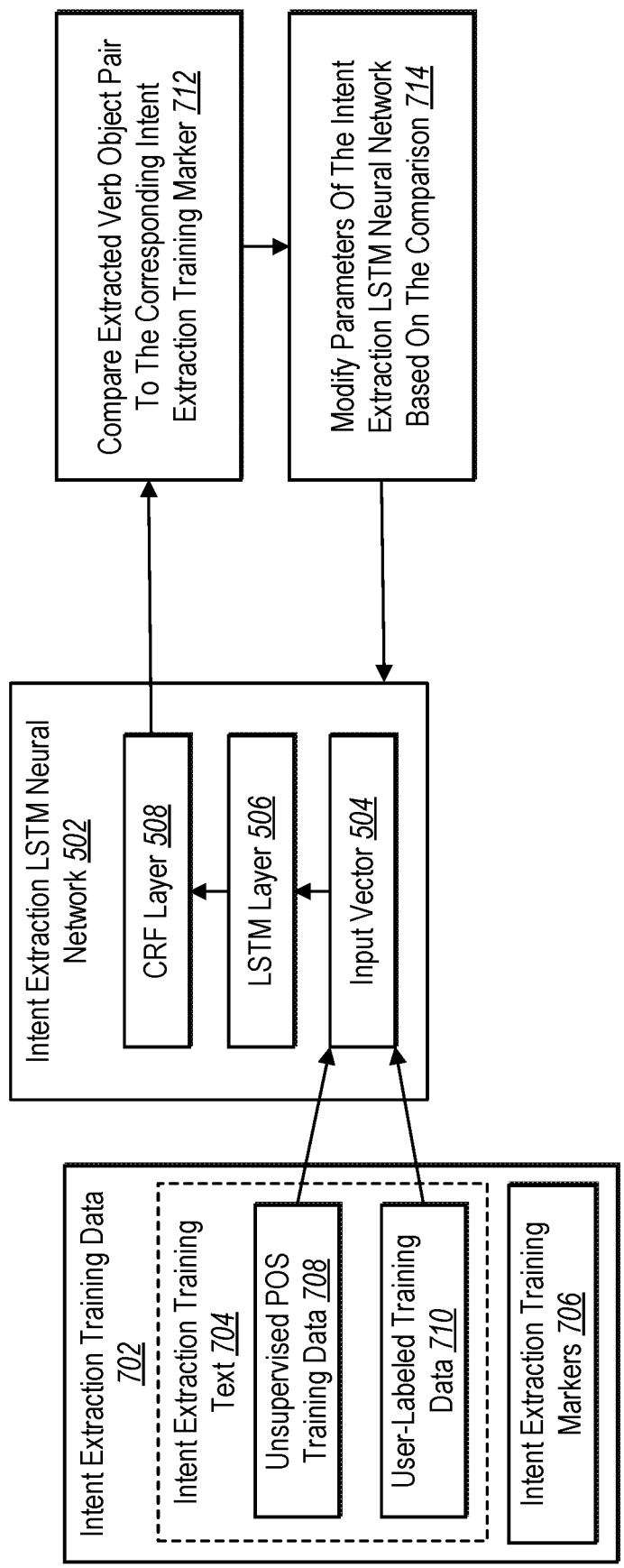
FIG. 7 illustrates a diagram of training an intent extraction LSTM neural network in accordance with one or more embodiments.

As discussed above, the open intent system 102 can train an intent extraction LSTM neural network to extract one or more open intents from a text input. For instance, FIG. 7 illustrates the open intent system 102 training an intent extraction LSTM neural network in accordance with one or more embodiments. Specifically, as shown in FIG. 7, the open intent system 102 identifies intent extraction training data 702. For example, the open intent system 102 trains the intent extraction LSTM neural network 502 based on intent extraction training text 704 and intent extraction training markers 706. In one or more embodiments, the open intent system 102 trains the intent extraction LSTM neural network 502 by providing a text input from the intent extraction training text 704 to the intent extraction LSTM neural network 502 as one or more input vectors, comparing the output of the intent extraction LSTM neural network 502 to the intent extraction training marker that corresponds to the text input, and then modifying the parameters of the intent extraction LSTM neural network 502 based on the comparison. This process will now be described in greater detail.

As shown in FIG. 7, the intent extraction training data 702 includes intent extraction training text 704 and the intent extraction training markers 706. In one or more embodiments, the intent extraction training text 704 includes unsupervised POS training data 708 (i.e., dependency parser training data) and user-labeled training data 710. For example, the open intent system 102 utilizes an unsupervised domain adaptation strategy that does not require labeled data in the target domain. As such, the unsupervised POS training data 708 includes text inputs including sentences taken from a wide range of conversational domains. In at least one embodiment, the intent extraction training marker that corresponds with a text input in the unsupervised POS training data 708 includes a part of speech tag for each word in the text input and identifies any intent (e.g., verb object pair) among the words in the text input. In one or more embodiments, the open intent system 102 can utilize unsupervised POS training data 708 and associated intent extraction training markers 706 generated by an open source or commercially available POS model.

To illustrate, in one or more embodiments, the open intent system 102 generates the unsupervised POS training data 708 by providing training text to a previously trained dependency parsing model that predicts part of speech (e.g., verb and object tags) in each training text input. In at least one embodiment, the open intent system 102 utilizes the the part of speech predictions output by the previously trained model as intent extraction training markers (e.g., ground truths) that correspond to the training text inputs. Thus, the training text inputs and corresponding part of speech predictions become the unsupervised POS training data 708. One such previously trained model that may be utilized by the open intent system 102 is the Stanford Dependency Parser from the Stanford CoreNLP as described in Manning, C., Surdeanu, M., Bauer, J., Finkel, J., Bethard, S., & McClosky, D. (2014), The Stanford CoreNLP natural language processing toolkit, *Proceedings of 52nd annual meeting of the association for computational linguistics: system demonstrations* (pp. 55-60).

The intent extraction training text also includes user-labeled training data 710. For example, the open intent system 102 can utilize user-labeled text inputs to fine-tune the training of the intent extraction LSTM neural network 502. For instance, the user-labeled training data 710 can include text inputs and the intent extraction training marker associated with each text input includes user-labeled tags identifying verb object pairs in the text input. In one or more embodiments, the open intent system 102 can utilize user-labeled training data 710 generated across unrelated domains via a crowd sourcing application such as AMAZON MECHANICAL TURK.

To begin training the intent extraction LSTM neural network 502, the open intent system 102 provides a text input from the unsupervised POS training data 708 to the input layer 504. In one or more embodiments, the intent extraction LSTM neural network 502 analyzes each word in the input text, passes latent feature vectors between units and layers in the intent extraction LSTM neural network 502 to retain and encode contextual meaning, and generate a prediction of a part of speech associated with each word in the text input. The CRF layer 508 of the intent extraction LSTM neural network 502 then utilizes the vector representation generated by the LSTM layer 506 to tag each word in the text input. In at least one embodiment, the CRF layer 508 can assign one of three tags to each word in the text input including "none," "verb," and "object" (e.g., as shown by the labels 510*a*, 510*b*, 510*c*, 510*d*, 510*e*, 510*f*, and 510*g* in FIG. 5). Following this, the open intent system 102 extracts verb object pairs based on a number of words between an identified verb and object (e.g., the physical "closeness" of the verb and object), and/or based on a semantic "closeness" of an identified verb and object.

After the intent extraction LSTM neural network 502 extracts one or more intents (e.g., verb object pairs) from the input text, the open intent system 102 continues training the intent extraction LSTM neural network 502 by performing the step 712 of comparing each extracted verb object pair to the corresponding intent extraction training marker. As discussed above, the intent extraction training marker that corresponds to a text input includes a part of speech tag for each word in the text input and one or more verb object pairs found in the text input. As such, the open intent system 102 performs the step 712 by determining whether the one or more verb object pairs extracted by the intent extraction LSTM neural network 502 match the one or more verb object pairs in the corresponding intent extraction training marker.

Based on the comparison in the step 712, the open intent system 102 further trains the intent extraction LSTM neural network 502 by performing the step 714 of modifying parameters of the intent extraction LSTM neural network 502. For example, based on the comparison in the step 712, the open intent system 102 can modify parameters of the LSTM layer 506 and the CRF layer 508 to reduce the measure of loss.

After utilizing the unsupervised POS training data 708 to train the intent extraction LSTM neural network 502, the open intent system 102 can further refine the training of the intent extraction LSTM neural network 502 by applying the intent extraction LSTM neural network 502 to the generic user-labeled training data 710. In one or more embodiments, the open intent system 102 continues training the intent extraction LSTM neural network 502 utilizing a stochastic gradient descent approach that repeatedly uses samples of the same training data until conversion happens (e.g., loss does not further decrease). For example, the open intent system 102 can stop training before overfitting occurs by observing the loss on a validation set and stopping training at the minimized validation loss.

In one or more embodiments, the open intent system 102 utilizes various metrics to evaluate the training of the intent extraction LSTM neural network 502. For example, for a text input including multiple intents, the open intent system 102 can utilize a precision metric that determines whether the number of correctly predicted verb, object, or verb object pair is in the top three numbers of predicted intents. The open intent system 102 can also utilize a recall metric that determines whether the number of correctly predicted verb, object, or verb object pair is in the top three number of correct intents in the intent extraction training markers 706 (e.g., the ground truth). The open intent system 102 can also determine the mean reciprocal rank by averaging the multiplicative inverses of the rank of the first correctly predicted verb, object, or verb object pair. Additionally, the open intent system 102 can determine a semantic similarity by finding a pairwise cosine similarity between predicted and actual intents based on pre-trained embeddings of the intent words from a different system.

The open intent system 102 may periodically retrain the intent extraction LSTM neural network 502 in the same manner illustrated in FIG. 7. Once training of the intent extraction LSTM neural network 502 is complete, the open intent system 102 can apply the intent extraction LSTM neural network 502 to unknown text inputs (e.g., text inputs with no corresponding training markers).

As discussed above, by utilizing the trained intent extraction LSTM neural network 502, the open intent system 102 operates more efficiently and accurately. For example, experimenters compared a trained intent extraction LSTM neural network against a Stanford Dependency Parser with regard to precision (number of correctly predicted items in top 3/number of predicted items), recall (number of correctly predicted items in top 3/number of target items in ground truth), mean reciprocal rank (averaging the multiplicative inverses of the rank of the first correctly predicted item, such as verbs, objects, verb-object pairs), and semantic similarity (pairwise cosine similarity between predicted and actual intents based on pre-trained GloVe embeddings). The results of this snapshot experimentation are shown in Table 2 below (these results are improved with additional or modified training parameters):

TABLE 2

| Metric | SC Parser | Trained Intent Extraction LSTM Neural Network |
|---|---|---|
| Verb P/R/F1 | 0.43/0.39/0.41 | 0.75/0.75/0.75 |
| Obj P/R/F1 | 0.46/0.41/0.43 | 0.76/0.745/0.75 |
| VO P/R/F1 | 0.34/0.32/0.33 | 0.66/0.65/0.64 |
| VO MRR | 0.4 | 0.74 |
| Semantic Similarity | 0.47 | 0.76 |

In Table 2, VO refers to verb-object; SC refers to Stanford CoreNLP parser; P, R, F1 are precision, recall, and F1 respectively; and MRR stands for mean reciprocal rank.

Figure 8:
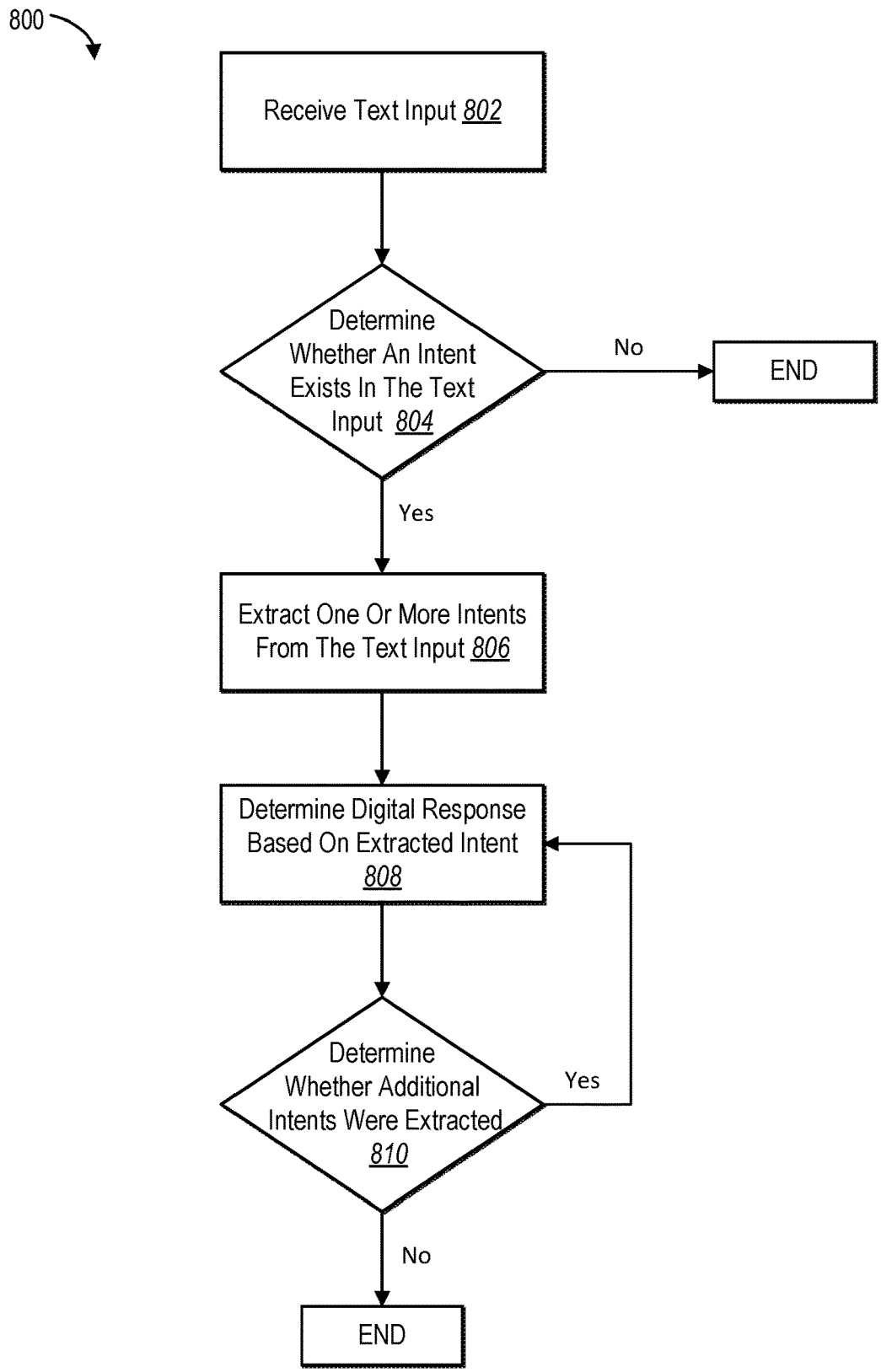
FIG. 8 illustrates a flowchart of a series of acts for identifying and extracting an open intent in accordance with one or more embodiments.

FIG. 8 illustrates an example process by which the open intent system 102 identifies open intents in accordance with one or more embodiments. For example, as shown in FIG. 8, the open intent system 102 performs the step 802 of receiving the text input. In one or more embodiments, the process 800 illustrated in FIG. 8 may be during a non-training phase of the open intent system 102. As such, the open intent system 102 may have previously trained the intent existence LSTM neural network 402 and the intent extraction LSTM neural network 502. Further, as mentioned above, the step 802 may involve receiving the text input as an electronic communication from a client computing device. Additionally or alternatively, the step 802 may involve receiving the text input as a text transcription of an audio input provided by a client computing device.

After receiving the text input, the open intent system 102 performs the step 804 of determining whether an intent exists in the text input. As discussed above, in one or more embodiments, the open intent system 102 performs the step 804 by applying the trained intent existence LSTM neural network 402 to the text input. For example, the open intent system 102 can apply the intent existence LSTM neural network 402 to the text input by providing the text input to the input layer 404 of the intent existence LSTM neural network 402. From there, as discussed above, the intent existence LSTM neural network 402 performs a probability-based analysis of the text input to generate a binary intent existence prediction indicating whether or not the text input includes at least one intent.

In response to the intent existence LSTM neural network 402 generating the intent existence prediction, the process 800 can either continue or end. For example, in response to a negative intent existence prediction (e.g., a "no" prediction), the open intent system 102 can end. For instance, the open intent system 102 can end by: discarding the text input, returning an error message, returning a standard response, or providing the text input to a different system or process (e.g., another text response system). After ending the process 800, the open intent system 102 can go into a ready mode while waiting for an additional text input.

Alternatively, in response to a positive intent existence prediction (e.g., a "yes" prediction), the open intent system 102 can continue with the process 800. For example, as shown in FIG. 8, in response to a positive intent existence prediction, the open intent system 102 can perform the step 806 of extracting at least one open intent from the text input. As discussed above, in one or more embodiments, the open intent system 102 extracts one or more open intents from a text input by applying the trained intent extraction LSTM neural network 502 to the text input. For example, the open intent system 102 can apply the intent extraction LSTM neural network 502 to the text input by providing the text input to the input layer 504 of the intent extraction LSTM neural network 502. From there, as discussed above, the intent extraction LSTM neural network 502 performs a probability-based analysis of the words in the text input in order to extract one or more intents as verb object pairs.

After the intent extraction LSTM neural network 502 extracts the one or more intents from the text input, the open intent system 102 can perform the step 808 of determining a digital response based on each extracted intent. For example, the open intent system 102 can determine a digital response based on one extracted intent at a time. In one or more embodiments, the open intent system 102 can determine a digital response such as generating a query-based response, identifying a trend, or performing another digital action. The open intent system 102 can either perform the determined digital response, or can generate a signal or message to another system regarding the determined digital response.

After determining the digital response based on the extracted intent, the open intent system 102 can perform the step 810 of determining whether additional intents were extracted from the text input. For example, as mentioned above, the intent extraction LSTM neural network 502 can extract as many intents as exist in a text input. Accordingly, the open intent system 102 can determine a digital response for each extracted intent. If additional extracted intents exist that have not been addressed (e.g., "yes"), the open intent system 102 can perform the step 808 based on the next unaddressed extracted intent. If all of the extracted intents have been addressed (e.g., "no"), the open intent system 102 can end the process 800.

Figure 9:
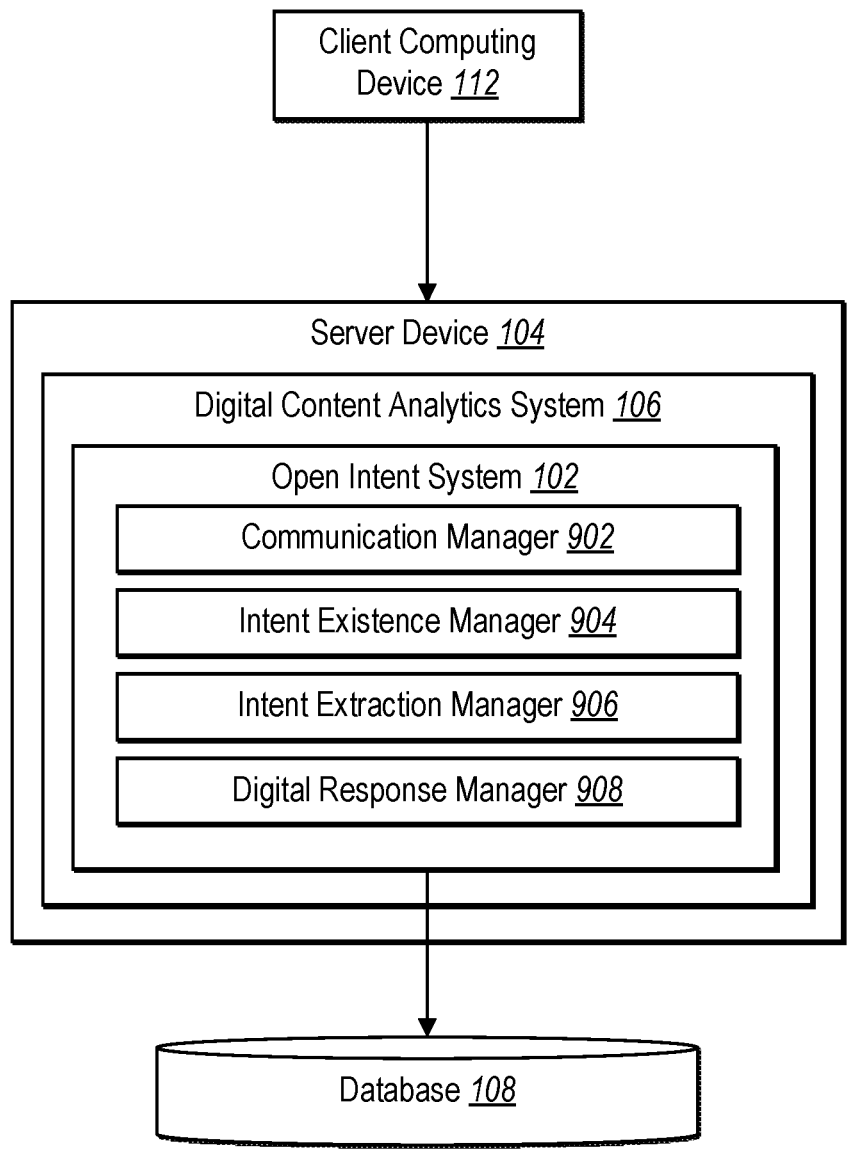
FIG. 9 illustrates a schematic diagram of the open intent system in accordance with one or more embodiments.

As described in relation in FIGS. 1-8, the open intent system 102 performs operations for training and utilizing LSTM neural networks to extract open intents from text inputs. FIG. 9 illustrates a detailed schematic diagram of an embodiment of the open intent system 102 described above. Although illustrated on the server device 104, as mentioned above, the open intent system 102 can be implemented by one or more different or additional computing devices (e.g., the client computing device 112). In one or more embodiments, the open intent system 102 includes a communication manager 902, an intent existence manager 904, an intent extraction manager 906, and a digital response manager 908.

Each of the components 902-908 of the open intent system 102 can include software, hardware, or both. For example, the components 902-908 can include one or more instructions stored on a computer-readable storage medium and executable by processors of one or more computing devices, such as a client device or server device. When executed by the one or more processors, the computer-executable instructions of the open intent system 102 can cause the computing device(s) to perform the methods described herein. Alternatively, the components 902-908 can include hardware, such as a special-purpose processing device to perform a certain function or group of functions. Alternatively, the components 902-908 of the open intent system 102 can include a combination of computer-executable instructions and hardware.

Furthermore, the components 902-908 of the open intent system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-908 may be implemented as a stand-alone application, such as a desktop or mobile application. Furthermore, the components 902-908 may be implemented as one or more web-based applications hosted on a remote server. The components 902-908 may also be implemented in a suite of mobile device applications or "apps." To illustrate, the components 902-908 may be implemented in an application, including but not limited to ADOBE ANALYTICS CLOUD, such as ADOBE ANALYTICS, ADOBE AUDIENCE MANAGER, ADOBE CAMPAIGN, ADOBE EXPERIENCE MANAGER, and ADOBE TARGET and/or ADOBE CREATIVE CLOUD, such as ADOBE PHOTOSHOP, ADOBE ACROBAT, ADOBE ILLUSTRATOR, and ADOBE® INDESIGN. "ADOBE", "ANALYTICS CLOUD", "ANALYTICS", "AUDIENCE MANAGER", "CAMPAIGN", "EXPERIENCE MANAGER", "TARGET," "CREATIVE CLOUD," "PHOTOSHOP," "ACROBAT," "ILLUSTRATOR," and "INDESIGN" are either registered trademarks or trademarks of Adobe Systems Incorporated in the United States and/or other countries.

As mentioned above, and as shown in FIG. 9, the open intent system 102 includes a communication manager 902. In one or more embodiments, the communication manager 902 handles communications between the open intent system 102 and other computing devices. For example, the communication manager 902 can send and receive information to and from the client computing device 112. To illustrate, the communication manager 902 can receive a text input from the client computing device 112 and can send a determined digital response back to the client computing device 112 based on one or more open intents extracted from the text input. Additionally or alternatively, the communication manager 902 can send and receive information to and from other systems such as other natural language processing systems, analysis systems, database querying systems, and so forth.

As mentioned above, and as shown in FIG. 9, the open intent system 102 also includes an intent existence manager 904. In one or more embodiments, the intent existence manager 904 trains and utilizes an intent existence LSTM neural network (e.g., the intent existence LSTM neural network 402). As discussed above with reference to FIG. 6, the intent existence manager 904 trains the intent existence LSTM neural network with intent existence training data that is not specific to any particular category of intents. Further, as discussed above with reference to FIG. 8, the intent existence manager 904 applies the intent existence LSTM neural network to a user-provided text input to generate an intent existence prediction specifying a likelihood that the text input includes at least one intent.

Additionally, as mentioned above, and as shown in FIG. 9, the open intent system 102 includes an intent extraction manager 906. In one or more embodiments, the intent extraction manager 906 trains and utilizes an intent extraction LSTM neural network (e.g., the intent extraction LSTM neural network 502). As discussed above with reference to FIG. 7, the intent extraction manager 906 trains the intent extraction LSTM neural network utilizing an unsupervised domain adaptation strategy that does not require labeled training data in a specific target domain. Specifically, the intent extraction manager 906 trains the intent extraction LSTM neural network with dependency parser training data, and then fine-tunes the training of the intent extraction LSTM neural network with user-labeled training data. Further, as discussed above with reference to FIG. 8, the intent extraction manager 906 applies the intent extraction LSTM neural network to a user-provided text input to extract one or more intents as verb object pairs from the text input.

Furthermore, as mentioned above, and as shown in FIG. 9, the open intent system 102 includes a digital response manager 908. In one or more embodiments, the digital response manager 908 determines a digital response to a text input based on the one or more intents extracted via the intent extraction manager 906. For example, the digital response manager 908 can perform actions including querying a customer support database (e.g., the database 108) based on the verb object pair, generating a digital response to the text input based on the query results, and providing the generated digital response to the client computing device 112. Specifically, responses determined by the digital response manager 908 can include, but are not limited to: generating a text response (e.g., a text message response to a query), executing a requested function (e.g., modifying a digital image), detecting common issues reported to customer support or public forums; highlighting calls to action in emails, documents, or recorded meetings and conversations; improving summarization; routing text inputs to specialized services or bots; assigning customer support requests to experts; and recommending help and other content to users.

Figure 10:
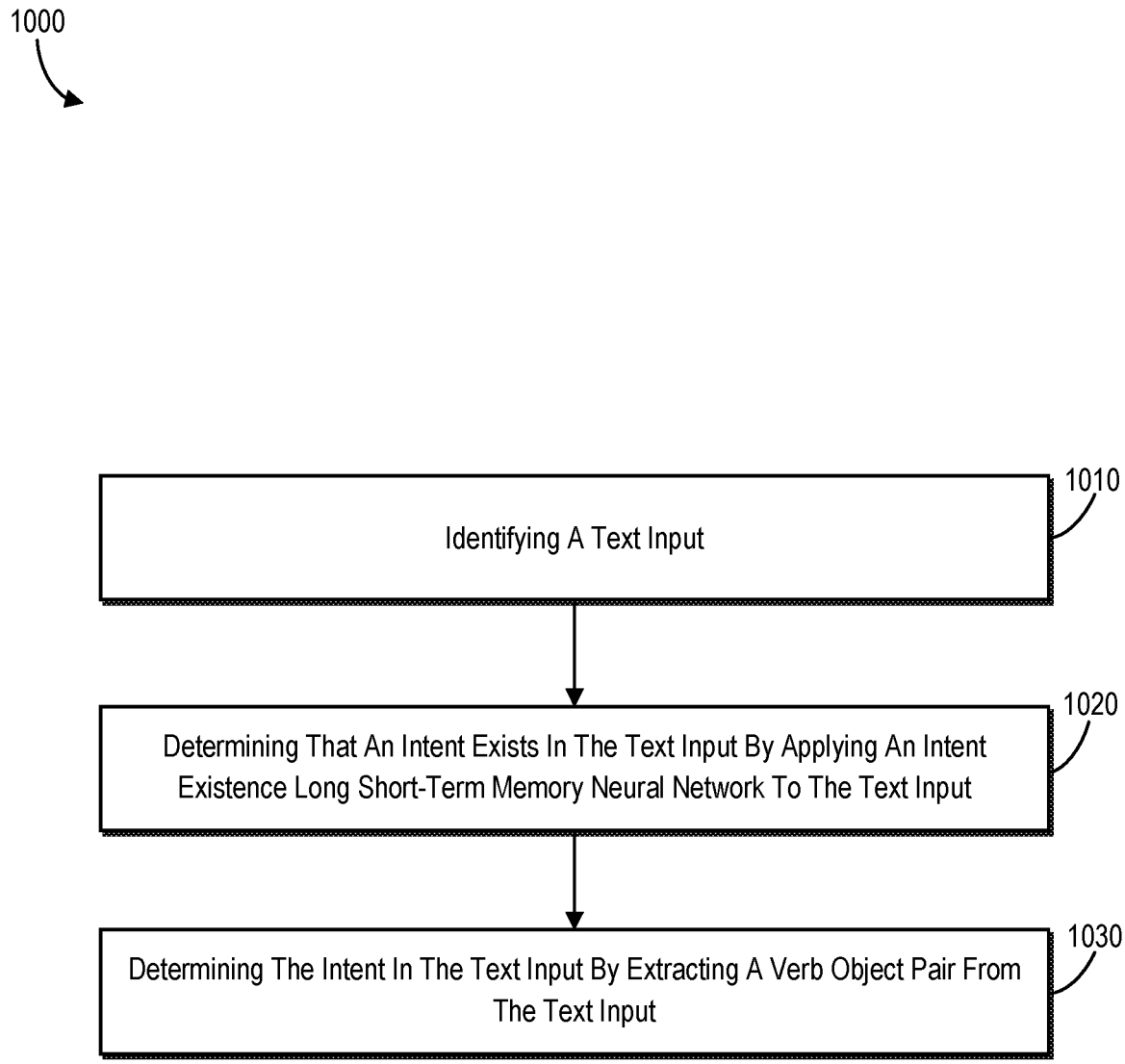
FIG. 10 illustrates a flowchart of a series of acts for applying one or more LSTM neural networks to a text input in accordance with one or more embodiments.
Figure 11:
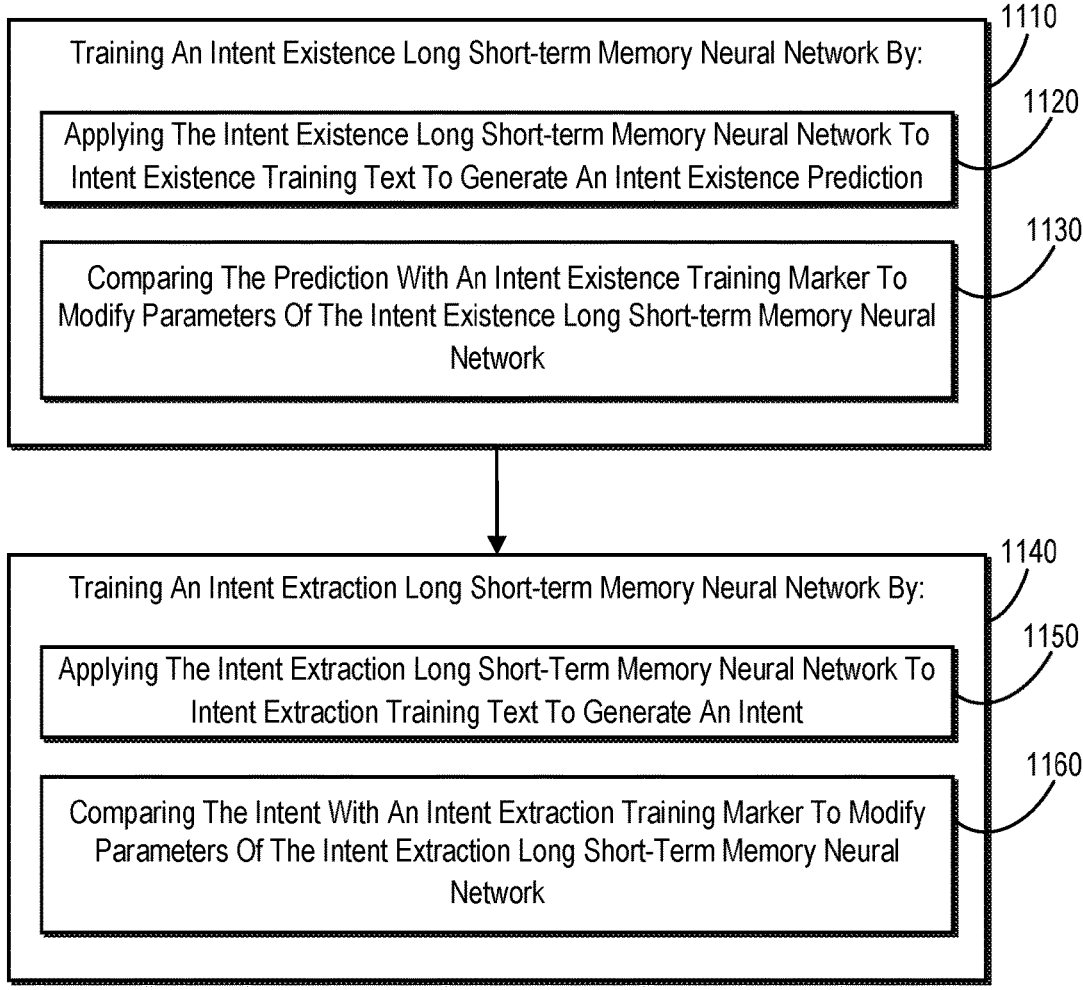
FIG. 11 illustrates another flowchart of a series of acts for training one or more LSTM neural networks to identify and extract open intents from text input in accordance with one or more embodiments.

FIGS. 1-9, the corresponding text, and the examples provide a number of different methods, systems, devices, and non-transitory computer-readable media of the open intent system 102. In addition to the foregoing, one or more embodiments can also be described in terms of flowcharts comprising acts for accomplishing a particular result, as shown in FIGS. 10 and 11. FIGS. 10 and 11 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for applying one or more LSTM neural networks to a text input in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1010 of identifying a text input. For example, the act 1010 can involve identifying a text input via a client computing device. In one or more embodiments, identifying the text input can involve identifying the text input from an electronic communication from the client computing device, or transcribing the text input from an audio input from the client computing device.

Additionally, the series of acts 1000 includes an act 1020 of determining that an intent exists in the text input by applying an intent existence long short-term memory neural network to the text input. For example, the act 1020 can involve determine that an intent exists in the text input by: applying an intent existence long short-term memory neural network to the text input, wherein the intent existence long short-term memory neural network is trained to determine existence of training intents from intent existence training text and corresponding intent existence training markers. In one or more embodiments, the intent is an open intent and the intent existence training text and corresponding intent existence training markers correspond to one or more open training intents.

In one or more embodiments, applying the intent existence long short-term memory neural network to the text input includes: embedding the text input into one or more neural network input vectors; and generating an intent existence prediction by analyzing the one or more neural network input vectors via a plurality of long short-term memory units of the intent existence long short-term memory neural network. In at least one embodiment, generating the intent prediction further includes applying a max pooling layer to outputs of the plurality of long short-term memory units; and the plurality of long short-term memory units are organized bi-directionally in two layers.

Additionally, as shown in FIG. 10, the series of acts 1000 includes an act 1030 of determining the intent in the text input by extracting a verb object pair from the text input. For example, the act 1030 can involve, in response to determining that the intent exists in the text input, determining the intent by extracting a verb object pair from the text input. In one or more embodiments, extracting the verb object pair from the text input includes: applying an intent extraction long short-term memory neural network to the text input, wherein the intent extraction long short-term memory neural network is trained to extract training intents from intent extraction training text and corresponding intent extraction training markers. In at least one embodiment, applying the intent extraction long short-term memory neural network to the text input includes: embedding the text input into at least one neural network input vector; and generating at least one intent by analyzing the at least one neural network input vector via a plurality of long short-term memory units of the intent extraction long short-term memory neural network.

Furthermore, applying the intent extraction long short-term memory neural network to the text input can further include applying a conditional random field layer to output of the plurality of long short-term memory units of the intent extraction long short-term memory neural network to identify the verb object pair. In at least one embodiment, the series of acts 1000 also includes, in response to extracting a verb object pair from the text input: querying a customer support database based on the verb object pair; generating a digital response to the text input based on the query results; and providing the generated digital response to the client computing device.

In addition (or in the alternative) to the acts described above, in some embodiments, the acts 1000 include a step for training an intent existence long short-term memory neural network and an intent extraction long short-term memory neural network. In particular, the algorithm and acts described above in relation to FIGS. 6 and 7 can comprise the corresponding acts for training an intent existence long short-term memory neural network and an intent extraction long short-term memory neural network.

FIG. 11 illustrates a flowchart of a series of acts 1100 for training one or more LSTM neural networks to identify and extract open intents from text input in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1110 of training an intent existence long short-term memory neural network. For example, the act 1110 can involve training an intent existence long short-term memory neural network by performing the acts 1120 and 1130.

Thus, it follows that the series of acts 1100 includes the act 1120 of applying the intent existence long short-term memory neural network to intent existence training text to generate an intent existence prediction. For example, the act 1120 can involve applying the intent existence long short-term memory neural network to intent existence training text to generate a prediction of whether the intent existence training text comprises at least one training intent. In one or more embodiments, applying the intent existence long short-term memory neural network to intent existence training text to generate a prediction of whether the intent existence training text includes at least one training intent includes applying the intent existence long short-term memory neural network to: a plurality of positive text inputs comprising at least one training intent, and a plurality of negative text inputs comprising no training intent.

As further shown in FIG. 11, the series of acts 1100 includes the act 1130 of comparing the prediction with an intent existence training marker to modify parameters of the intent existence long short-term memory neural network. For example, the act 1130 can involve comparing the prediction of whether the intent existence training text comprises the at least one training intent with an intent existence training marker to modify parameters of the intent existence long short-term memory neural network.

Additionally, the series of acts 1100 includes an act 1140 of training an intent extraction long short-term memory neural network. For example, the act 1140 can involve training the intent extraction long short-term memory neural network by performing the acts 1150 and 1160.

As such, the series of acts 1100 includes the act 1150 of applying the intent extraction long short-term memory neural network to intent extraction training text to generate an intent. For example, the act 1150 can involve applying the intent extraction long short-term memory neural network to intent extraction training text comprising a training intent to generate an intent comprising a verb and an object. In one or more embodiments, applying the intent extraction long short-term memory neural network to intent extraction training text includes applying the intent extraction long short-term memory neural network to (unsupervised) dependency parser training data. For instance, the dependency parser training data can include training sentences labeled for verbs and objects. Additionally, applying the intent extraction long short-term memory neural network to intent extraction training text can further include applying the intent extraction long short-term memory neural network to user-labeled training data.

In one or more embodiments, the intent existence training text and the intent extraction training text are not classified to a category of intents (e.g., an intent category). Furthermore, in one or more embodiments, the intent existence long short-term memory neural network includes a plurality of long short-term memory units organized bi-directionally in two layers and a soft max pooling layer, and the intent extraction long short-term memory neural network includes a plurality of long short-term memory units organized bi-directionally in a single layer and a conditional random field layer.

In addition (or in the alternative) to the acts described above, in some embodiments, the acts 1100 include a step for determining, via the intent existence long short-term memory neural network, that an intent exists in the text input and/or a step for determining, via the intent extraction long short-term memory neural network, the intent from the text input. In particular, the algorithm and acts described above in relation to FIGS. 4 and 8 (e.g., the act 804) can comprise the corresponding acts (or structure) for determining, via the intent existence long short-term memory neural network, that an intent exists in the text input. Moreover, the algorithms and acts described above in relation to FIGS. 5 and 8 can comprise the corresponding acts (or structure) for determining, via the intent extraction long short-term memory neural network, the intent from the text input.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
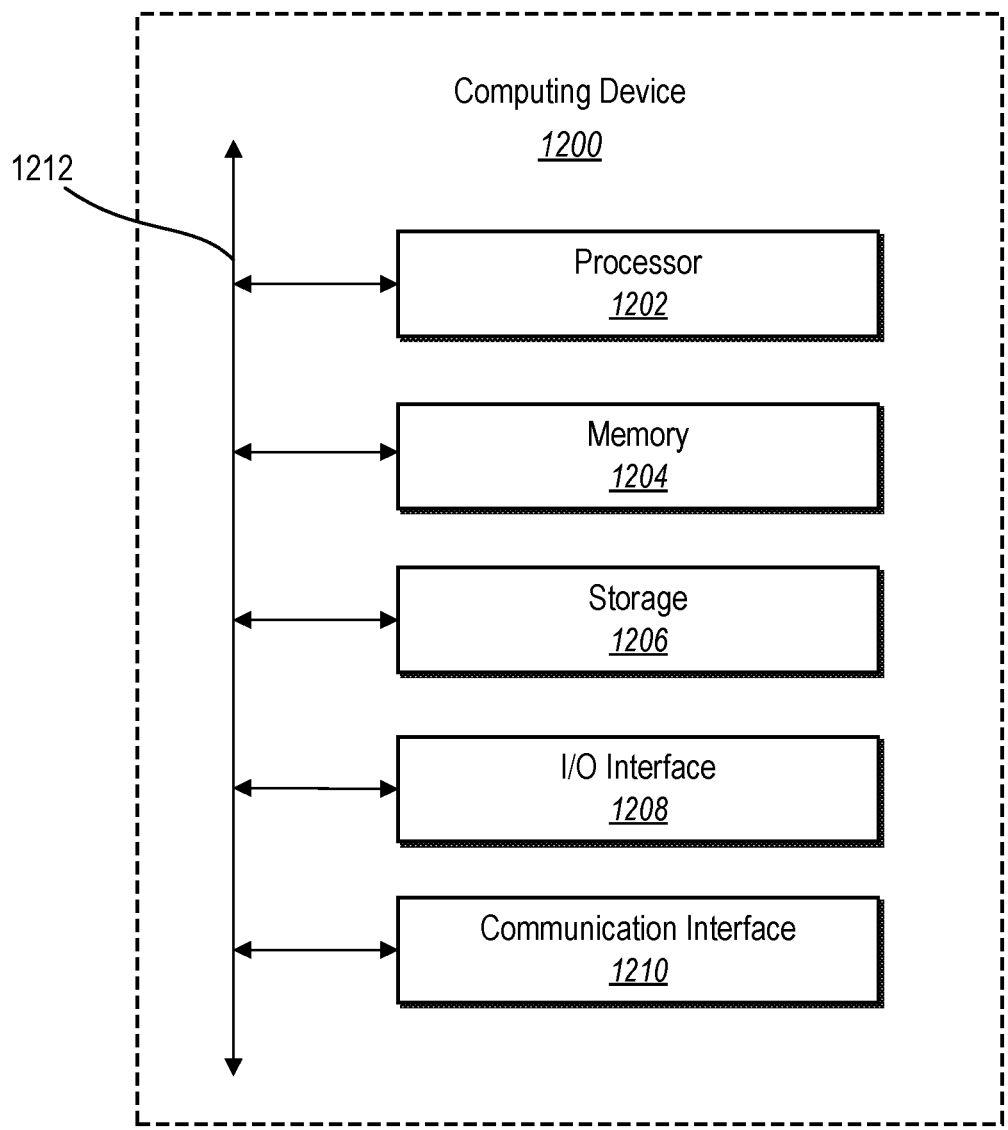
FIG. 12 illustrates a block diagram of an example computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., the server device 104, and the client computing devices 112). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

We claim:

1. A non-transitory computer-readable storage medium storing instructions thereon that, when executed by at least one processor, cause the at least one processor to perform operations comprising:
   receiving intent existence training texts comprising intent existence training markers and intent extraction training texts comprising open intent extraction training markers, wherein the intent existence training texts and the intent extraction training texts are not classified to an intent category;

training an intent existence long short-term memory neural network comprising a plurality of long short-term memory units organized bi-directionally in two layers and a soft max pooling layer determine whether a text input comprises an intent by:

applying the intent existence long short-term memory neural network to a plurality of positive text inputs comprising at least one training intent and a plurality of negative text inputs comprising no training intent to generate training intent predictions; and comparing the training intent predictions with intent existence training markers to modify parameters of the intent existence long short-term memory neural network; and training an intent extraction long short-term memory neural network comprising a plurality of long short-term memory units organized bi-directionally in a single layer and a conditional random field layer to extract an intent from the text input by:

applying the intent extraction long short-term memory neural network to dependency parser training data, wherein the dependency parser training data comprises training sentences labeled for verbs and objects generated via a dependency parsing model from unlabeled sentences;

fine-tuning the intent extraction long short-term memory neural network by applying the intent extraction long short-term memory neural network to and user-labeled training data comprising a training intent to generate an open intent by extracting a verb and an object from the user-labeled training data; and comparing the intent comprising the verb and the object with the open intent extraction training markers comprising a training verb and training object to modify parameters of the intent extraction long short-term memory neural network.

2. The non-transitory computer-readable storage medium as recited in claim 1, wherein applying the intent existence long short-term memory neural network to a plurality of positive text inputs comprises:

embedding the text input into one or more neural network input vectors; and generating a binary intent existence classification by analyzing the one or more neural network input vectors via a plurality of long short-term memory units of the intent existence long short-term memory neural network.

3. The non-transitory computer-readable storage medium as recited in claim 2, wherein:

generating the binary intent existence classification further comprises comparing the training intent predictions with the intent existence training markers.

4. The non-transitory computer-readable storage medium as recited in claim 1, wherein extracting the intent comprises extracting a verb object pair without classifying the verb object pair to a predefined category.

5. The non-transitory computer-readable storage medium as recited in claim 1, further comprising instructions that, when executed by the at least one processor, cause the at least one processor to extract the intent from the text input by:

applying an intent extraction long short-term memory neural network to the text input, wherein the intent extraction long short-term memory neural network is trained to extract intent tags from intent extraction training text and corresponding intent extraction training markers.

6. The non-transitory computer-readable storage medium as recited in claim 5, wherein applying the intent extraction long short-term memory neural network to the text input comprises:

embedding the text input into at least one neural network input vector; and generating at least one vector representation by analyzing the at least one neural network input vector via a plurality of long short-term memory units of the intent extraction long short-term memory neural network.

7. The non-transitory computer-readable storage medium as recited in claim 6, wherein applying the intent extraction long short-term memory neural network to the text input further comprises:

applying a conditional random field layer to the at least one vector representation from the plurality of long short-term memory units of the intent extraction long short-term memory neural network to identify at least one intent tag; and determining the intent based on the at least one intent tag.

8. The non-transitory computer-readable storage medium as recited in claim 1, further comprising, in response to extracting the intent from the text input:

querying a customer support database based on the intent;

generating a digital response to the text input based on query results; and providing the generated digital response to a client computing device.

9. A system comprising:

at least one memory device; and at least one processing device coupled to the at least one memory device, the at least one processing device to perform operations comprising:

receiving intent existence training texts comprising intent existence training markers and intent extraction training texts comprising open intent extraction training markers, wherein the intent existence training texts and the intent extraction training texts are not classified to an intent category;

training an intent existence long short-term memory neural network comprising a plurality of long short-term memory units organized bi-directionally in two layers and a soft max pooling layer to determine whether text comprises an intent by:

applying the intent existence long short-term memory neural network to a plurality of positive text inputs comprising at least one training intent and a plurality of negative text inputs comprising no training intent to generate training intent predictions; and comparing the training intent predictions with the intent existence training markers to modify parameters of the intent existence long short-term memory neural network; and training an intent extraction long short-term memory neural network comprising a plurality of long short-term memory units organized bi-directionally in a single layer and a conditional random field layer to extract one or more intents from text input by:

applying the intent extraction long short-term memory neural network to dependency parser training data, wherein the dependency parser training data comprises training sentences labeled for verbs and objects generated via a dependency parsing model from unlabeled sentences;

fine-tuning the intent extraction long short-term memory neural network by applying the intent extraction long short-term memory neural network to user-labeled training data comprising a training intent to generate an open intent by extracting a verb and an object from and the user-labeled training data; and comparing the intent comprising the verb and the object with the open intent extraction training markers comprising a training verb and training object to modify parameters of the intent extraction long short-term memory neural network.

10. The system as recited in claim 9, wherein applying the intent extraction long short-term memory neural network to extract one or more intents from the text input further comprises:

embedding the text input into at least one neural network input vector; and generating at least one vector representation by analyzing the at least one neural network input vector via a plurality of long short-term memory units of the intent extraction long short-term memory neural network.

11. The system as recited in claim 9, wherein applying the intent extraction long short-term memory neural network to dependency parser training data and user-labeled training data comprises generating a second intent comprising a second verb and a second object from a single text input.

12. The system as recited in claim 10, wherein applying the intent extraction long short-term memory neural network to extract one or more intents from the text input further comprises applying a conditional random field layer to the at least one vector representation from the plurality of long short-term memory units of the intent extraction long short-term memory neural network to identify at least one intent tag.

13. The system as recited in claim 12, further comprising determining the verb and the object based on the at least one intent tag.

14. The system as recited in claim 9, wherein training the intent existence long short-term memory neural network further comprises identifying question and answer pairs among the intent existence training texts.

15. The system as recited in claim 14, wherein identifying the question and answer pairs comprises discriminating desired actions from explanations that do not include an actionable intent.

16. A computer-implemented method comprising:

receiving intent existence training texts comprising intent existence training markers and intent extraction training texts comprising open intent extraction training markers, wherein the intent existence training texts and the intent extraction training texts are not classified to an intent category;

training an intent existence long short-term memory neural network comprising a plurality of long short-term memory units organized bi-directionally in two layers and a soft max pooling layer to determine whether a text input comprises an intent by:

applying the intent existence long short-term memory neural network to a plurality of positive text inputs comprising at least one training intent and a plurality of negative text inputs comprising no training intent to generate training intent predictions; and comparing the training intent predictions with intent existence training markers to modify parameters of the intent existence long short-term memory neural network; and training an intent extraction long short-term memory neural network comprising a plurality of long short-term memory units organized bi-directionally in a single layer and a conditional random field layer to extract an intent from the text input by:

applying the intent extraction long short-term memory neural network to dependency parser training data, wherein the dependency parser training data comprises training sentences labeled for verbs and objects generated via a dependency parsing model from unlabeled sentences;

fine-tuning the intent extraction long short-term memory neural network by applying the intent extraction long short-term memory neural network to user-labeled training data comprising a training intent to generate an open intent by extracting a verb and an object from the user-labeled training data; and comparing the intent comprising the verb and the object with the open intent extraction training markers comprising a training verb and training object to modify parameters of the intent extraction long short-term memory neural network.

17. The computer-implemented method as recited in claim 16, wherein applying the intent existence long short-term memory neural network to a plurality of positive text inputs comprises:

embedding the text input into one or more neural network input vectors; and generating a binary intent existence classification by analyzing the one or more neural network input vectors via a plurality of long short-term memory units of the intent existence long short-term memory neural network.

18. The computer-implemented method as recited in claim 16, further comprising extracting an additional open intent by extracting an additional verb and an additional object from the text input utilizing the intent extraction long short-term memory neural network.

19. The computer-implemented method as recited in claim 18, further comprising:

generating an additional binary intent existence classification from an additional text input utilizing the intent existence long short-term memory neural network; and in response to determining that no intent exists in the additional text input based on the additional binary intent existence classification, refraining from applying the intent extraction long short-term memory neural network to the additional text input.

20. The computer-implemented method as recited in claim 16, further comprising generating a digital text response based on the intent.

* * * * *